United States Patent
McBride et al.

(10) Patent No.: US 8,644,800 B2
(45) Date of Patent: Feb. 4, 2014

(54) SYSTEM AND METHOD FOR IDENTITY MANAGEMENT FOR MOBILE DEVICES

(75) Inventors: Brian Everett McBride, Carp (CA); Kenneth Jason William Lambert, Kanata (CA)

(73) Assignee: BlackBerry Limited, Waterloo (CA)

(*) Notice: Subject to any disclaimer, the term of this patent is extended or adjusted under 35 U.S.C. 154(b) by 0 days.

(21) Appl. No.: 13/397,348

(22) Filed: Feb. 15, 2012

(65) Prior Publication Data

US 2012/0214444 A1 Aug. 23, 2012

Related U.S. Application Data

(60) Provisional application No. 61/443,168, filed on Feb. 15, 2011, provisional application No. 61/443,175, filed on Feb. 15, 2011.

(51) Int. Cl.
*H04M 1/66* (2006.01)

(52) U.S. Cl.
USPC ......... 455/411; 455/410; 455/409; 455/414.1

(58) Field of Classification Search
USPC ........... 455/411, 410; 713/158, 166; 709/219, 709/248
See application file for complete search history.

(56) References Cited

U.S. PATENT DOCUMENTS

| | | | |
|---|---|---|---|
| 7,703,128 B2 | 4/2010 | Cross et al. | |
| 2009/0300746 A1 | 12/2009 | Ahn | |
| 2010/0242097 A1 | 9/2010 | Hotes et al. | |
| 2011/0213965 A1 | 9/2011 | Fu et al. | |

OTHER PUBLICATIONS

Giles Babin; International Search Report from corresponding PCT Applicaiion No. PCT/CA2012/050086; search completed Jun. 22, 2012; US 2010/0242097 (Hotes et al.) US 2011/0213965 (Fu et al.), Canada.

*Primary Examiner* — David Q Nguyen
(74) *Attorney, Agent, or Firm* — Wilfred P. So; Brett J. Slaney; Blake, Cassels & Graydon LLP.

(57) ABSTRACT

Systems and methods for managing a user identity on a mobile device are provided. The system comprises the mobile device comprising a user agent and a client application, the user agent and the client application in communication with each other. The system further comprises an identity provider in communication with the mobile device, and a client service in communication with the mobile device. The user agent is configured to communicate with the identity provider and retrieve the user identity for the client application, and the client application is configured to transmit the user identity to the client service.

20 Claims, 18 Drawing Sheets

SYSTEM AND METHOD FOR IDENTITY MANAGEMENT FOR MOBILE DEVICES

CROSS-REFERENCE TO RELATED APPLICATIONS

The present application claims priority from U.S. Provisional Application No. 61/443,168 filed on Feb. 15, 2011 (Title: System And Method For Identity Management For Mobile Devices; Inventors: Brian Everett McBride and Kenneth Jason William Lambert) and U.S. Provisional Application No. 61/443,175 filed on Feb. 15, 2011 (Title: System And Method for Identity Management For Mobile Devices; Inventors: Brain Everett McBride, Kenneth Jason William Lambert, and Jerome Bertrand Cornet), the contents of which are hereby incorporated by reference in their entirety.

TECHNICAL FIELD

The following relates to systems and methods for managing identity information on a mobile device.

BACKGROUND

A mobile device can be used for running various types of client applications. Examples of client applications include social networking applications, communication applications, advertising applications and banking applications. Several client applications may be loaded onto a mobile device, which makes the mobile device a resourceful tool.

Each application may require a user's personal information to operate. Such personal information is used to identify the user and is herein interchangeably referred to as user identity information and user profile data. Non-limiting examples of user identity information include first name, middle name, last name, birth date, sex, address, phone number, email address, citizenship, etc. For example, when registering to use a client application on a mobile device, a user typically provides the information requested by the client application. A user may also be required to provide further information upon logging into the client application on their mobile device.

BRIEF DESCRIPTION OF THE DRAWINGS

Embodiments will now be described by way of example only with reference to the appended drawings wherein.

DETAILED DESCRIPTION OF THE DRAWINGS

Mobile devices are used to operate many different types of applications, also called software programs. Many applications require a user to sign-in, register, or log-in to an account. Typically, a user identification (e.g. a user name) and a password are used to verify that the correct user is logging into a particular account. If there are more applications that are used on a mobile device, then a user is required to remember more user identifications and passwords. This can be troublesome. Further, if a user would like to use multiple applications upon turning on the device, then the user typically needs to manually enter a user identification and password for each of the applications. This is a time consuming process.

The management of user identifications and passwords becomes more cumbersome when a user owns multiple mobile devices which may operate common applications. When using multiple mobile devices, the user may need to sign-on to the same application on each mobile device. Thus, the user needs to sign-on multiple times. This process is also time consuming and inconvenient.

In other words, if there are many client applications that require a user to provide user identity information, the process of providing the requested user identity information requested becomes repetitive. If the user also owns multiple mobile devices each with multiple client applications, the repetitive effect of providing the requested information is multiplied.

Many client applications communicate with a remotely located client service for certain functionality. The client service often requires particular user profile data corresponding to the user of the mobile device. However, many users do not trust the mobile application with the user profile data.

It is recognized that user identity information (also referred herein as user profile data) is often used to register a new user onto an application account, or to sign a user into an application. The user identity information may be personal information and a user may not wish to have the personal information provided to entities that are not trusted. The user identity information can, for example, be used to commit identity fraud. It is recognized that when a user repetitively provides this personal information, it is possible that an adversary person or program has an increased chance to obtain the user identity information.

Figure 1A:
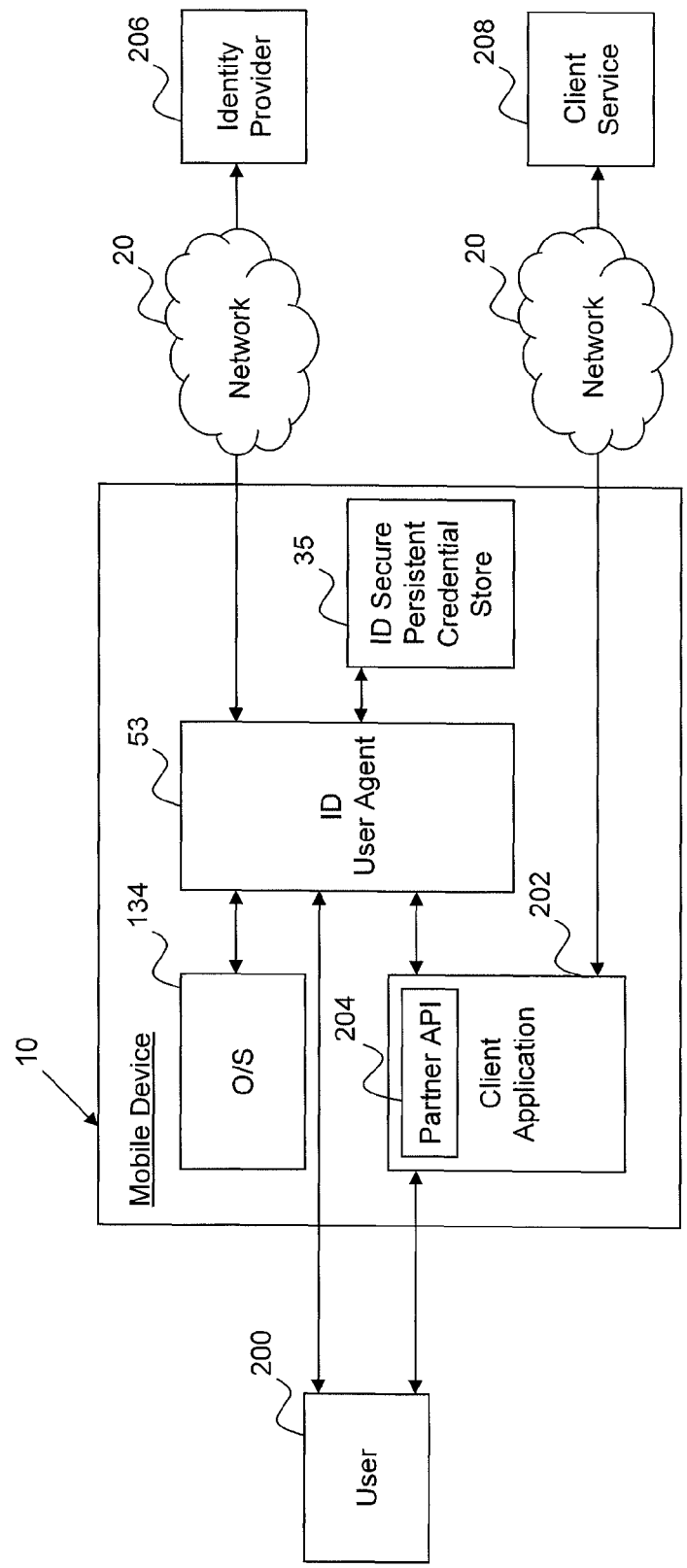
FIG. 1(a) is a block diagram illustrating a mobile device in communication with an identity provider and a client service.

To address the above issues, turning to FIG. 1(a), the proposed systems and methods provide an ID user agent 53 on a mobile device 10, which communicates with an identity provider 206 over a network 20. The ID user agent 53 (also referred to herein as a user agent), and identity provider 206, manage the user identity information which may be required or requested by one or more client applications 202 on the mobile device 202 or one or more client service 208 in communication with the client applications 202. The identity provider 206 and the client service 208 are computing devices, such as for example, servers. A user's identity information may be stored centrally on the identity provider 206. This may provide centralized security for the user identity information, as well as centralized access from multiple devices belonging to the user.

The mobile device 10 includes an operating system 134, user agent 53, ID secure persistent credential store 35, and client application 202. One or more client applications can be stored on the mobile device 10. Each client application 202 includes a partner API 204 which is an application programming interface used to interact with the user agent 53. The user agent 53 is invoked by the operating system 134, for example, when the mobile device 10 is powering up. The user agent 53 can store and retrieve data from the ID secure persistent credential store 35. The user agent 53 can also store and retrieve data external to the mobile device 10 on the identity provider 206, through network 20.

The user 200 interacts with the user agent 53 to provide and retrieve data. The user 200 also interacts with the client application 202.

The user agent 53 is used to manage the storage and retrieval of user identity information requested from either the client application 202, or from the client service 208. Notably, the client service 208 can communicate to the user agent 53 through the client application 202 over the network 20.

In an example embodiment, the client service 208 cannot communicate directly with the user agent 53 or the identity provider 206. This limits access to the user identity information stored on the identity provider 206. The user agent 53 on the mobile device 10 may, for example, be the only entity able to communicate with the identity provider 206.

In general, a system for managing user identity information on a mobile device 10 is provided. The system comprises the mobile device 10 comprising a user agent 53 and a client application 202, the user agent 53 and the client application 202 in communication with each other. The system further comprises an identity provider 206 in communication with the mobile device 10, and a client service 208 in communication with the mobile device 10. The user agent 53 is configured to communicate with the identity provider 206 and retrieve the user identity information for the client application 202, and the client application 202 is configured to transmit the user identity information to the client service 208.

Figure 1B:
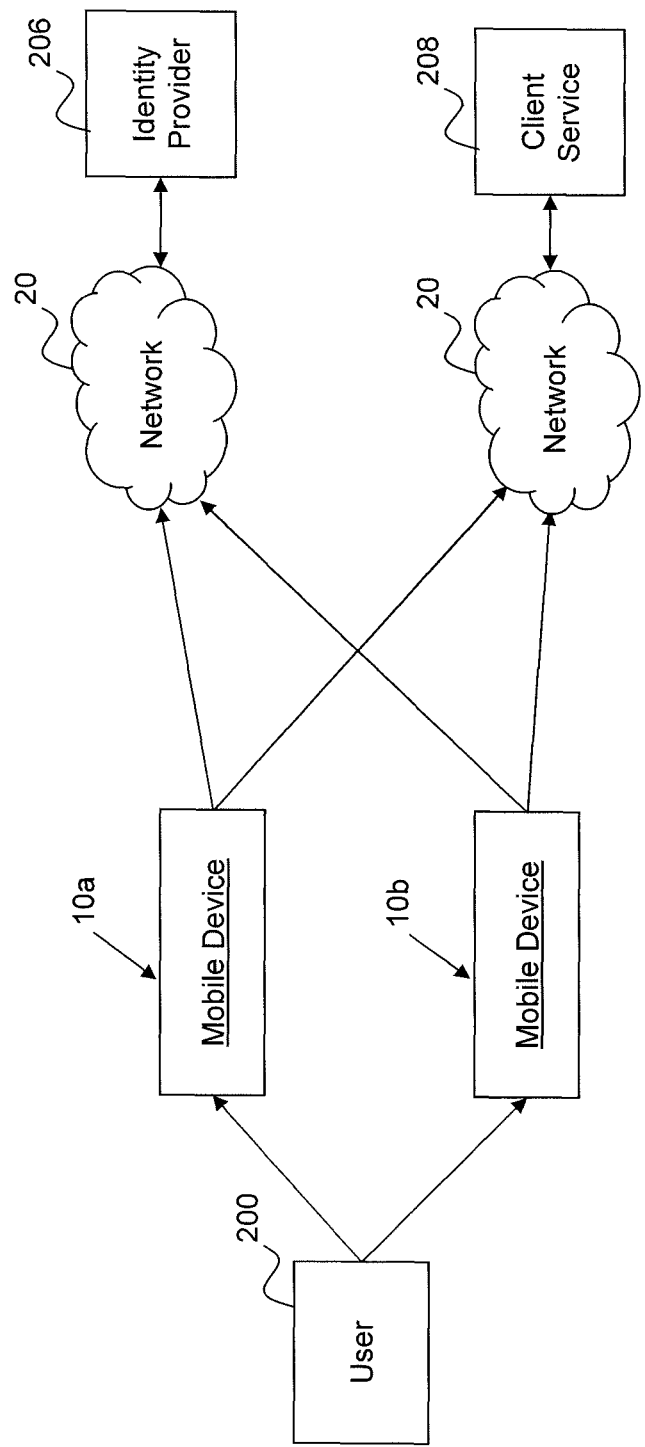
FIG. 1(b) is a block diagram illustrating multiple mobile devices in communication with the identity provider and the client service.

Turning to FIG. 1(b), a user 200 can use multiple mobile devices 10a, 10b. Each of the mobile devices 10a, 10b interact with the identity provider 206 and the client service 208 through the network 20. Examples of different types of mobile devices 10 include smart phones, cell phones, personal digital assistants, pagers, hand-held wireless devices, e-readers, tablets, laptops, netbooks, etc.

The proposed systems and methods provide users with a single sign-on experience when using client applications 202 and services on the mobile device 10. In other words, by signing into the user agent 53, a user 200 can sign into multiple client applications 202 simultaneously. The user 200 is also able to manage their identity information across multiple mobile devices 10. Therefore, regardless of which mobile device 10 the user is using, the user is able to sign on to the same applications without repetitively entering their information. The proposed systems and methods also provide privacy and security of the user's personal information from client applications 202. From the user's perspective, the user's identity information is managed in a consistent, simple and non-intrusive manner.

The following examples include communications between mobile or handheld devices, which will be commonly referred to as mobile devices hereinafter and referred to by numeral 10.

The mobile device 10 can be a multi-way communication device with advanced data communication capabilities including the capability to communicate with other mobile devices 10 or computer systems through a network of transceiver stations. The mobile device 10 may also have the capability to allow voice communication. Depending on the functionality provided by the mobile device 10, it may be referred to as a data messaging device, tablet, a multi-way pager, a cellular telephone with data messaging capabilities, a laptop, an e-reader, a wireless Internet appliance, or a data communication device (with or without telephony capabilities). The mobile device 10 can also be one that is used in a system that is configured for continuously routing all forms of pushed information from a host system 25 to the mobile device 10. One example of such a system will now be described making reference to FIG. 2.

Figure 2:
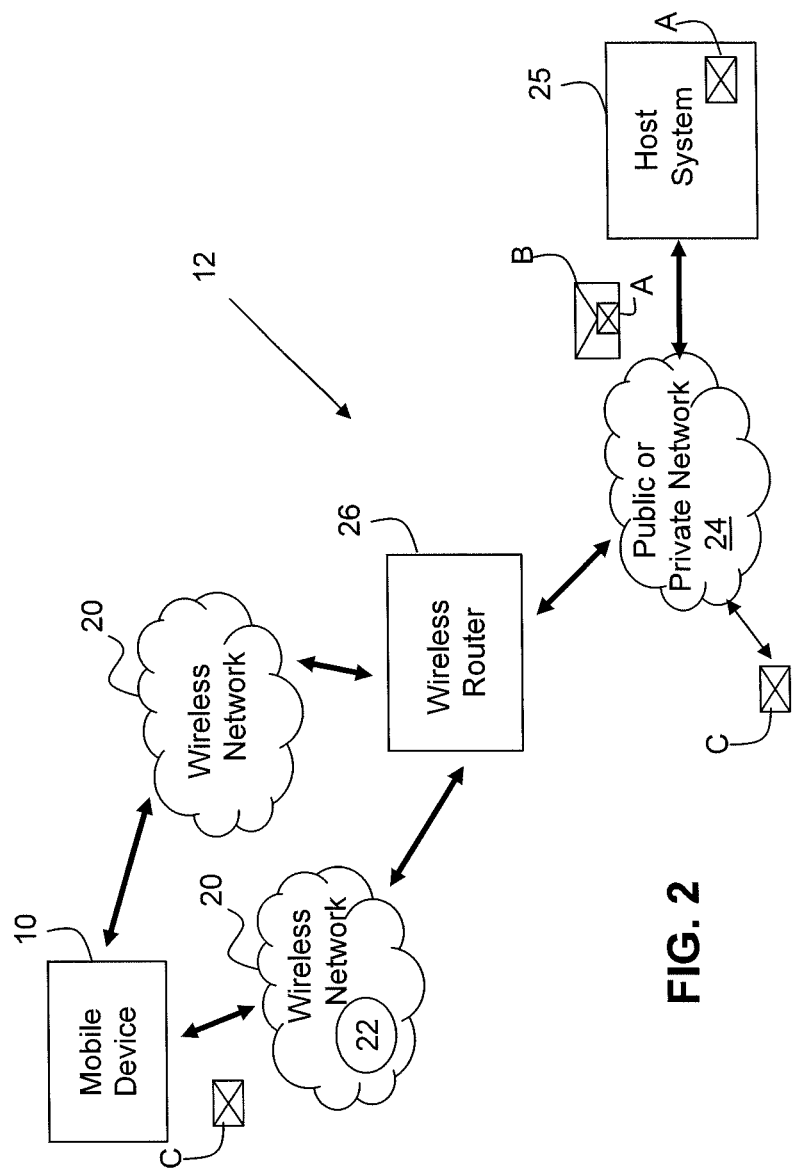
FIG. 2 is a schematic diagram illustrating a system in which data items are pushed from a host system to a mobile device.

FIG. 2 is an example system diagram showing the redirection of user data items (such as message A or C) from an intermediary computer system (host system) 25 to the user's mobile device 10 via a wireless router 26. The wireless router 26 provides the wireless connectivity functionality as it acts to both make transparent most of the wireless network's 20 complexities, and it also implements features necessary to support pushing data to the mobile device 10. Although not shown, a plurality of mobile devices may access data from the host system 25. In this example, message A in FIG. 2 represents an internal message sent from, e.g. a desktop computer (not shown) within the host system 25, to any number of server computers in the network (e.g. LAN), which may, in general, include a database server, an event server, an E-mail server or a voice-mail server.

Message C in FIG. 2 represents an external message from a sender that is not directly connected to the host system 25, such as the user's mobile device 10, some other user's mobile device (not shown), or any user connected to the public or private network 24 (e.g. the Internet). Message C could be e-mail, voice-mail, event information, database updates, web-page updates or could even represent a command message from the user's mobile device 10 to the host system 25. The host system 25 may comprise, along with the typical communication links, hardware and software associated with a computer network system, one or more wireless mobility agents, a TCP/IP connection, a collection of data stores, (for example a data store for e-mail could be an off-the-shelf mail server like Microsoft Exchange® Server or Lotus Notes® Server), all within and behind a network firewall.

The mobile device 10 may be adapted for communication within wireless network 20 via wireless links, as required by each wireless network 20 being used. As an illustrative example of the operation for a wireless router 26 shown in FIG. 2, consider a data item A, repackaged in outer envelope B (the packaged data item A now referred to as "data item (A)") and sent to the mobile device 10 from an Application Service Provider (ASP) in the host system 25. Within the ASP is a computer program, similar to a wireless mobility agent, running on any computer in the ASP's environment that is sending requested data items from a data store to a mobile device 10. The mobile-destined data item (A) is routed through the network 24, and through the wireless router's 26 firewall protecting the wireless router 26 (not shown).

Although the above describes the host system 25 as being used within a networked environment, this is just one embodiment of one type of host service that offers push-based messages for a handheld wireless device that is capable of notifying and presenting the data to the user in real-time at the mobile device when data arrives at the host system.

By offering a wireless router 26 (sometimes referred to as a "relay", "message server", "data redirector", etc.), there are a number of major advantages to both the host system 25 and the wireless network 20. The host system 25 in general runs a host service that is considered to be any computer program that is running on one or more computer systems. The host service is said to be running on a host system 25, and one host system 25 can support any number of host services. A host service may or may not be aware of the fact that information is being channelled to mobile devices 10. For example an e-mail or message program 138 (see FIG. 3) might be receiving and processing e-mail while an associated program (e.g. an e-mail wireless mobility agent) is also monitoring the mailbox for the user and forwarding or pushing the same e-mail to a wireless device 10. A host service might also be modified to prepared and exchange information with mobile devices 10 via the wireless router 26, like customer relationship management software. In a third example, there might be a common access to a range of host services. For example a mobility agent might offer a Wireless Access Protocol (WAP) connection to several databases.

Although the system is exemplified as operating in a multi-way communications mode, certain aspects of the system could be used in a "one and one-half" or acknowledgment paging environment, or even with a one-way paging system. In such limited data messaging environments, the wireless router 26 still could abstract the mobile device 10 and wireless network 20, offer push services to standard web-based server systems and allow a host service in a host system 25 to reach the mobile device 10 in many countries.

The host system 25 shown herein can have many methods when establishing a communication link to the wireless router 26. For one skilled in the art of data communications the host system 25 could use connection protocols like TCP/IP, X.25, Frame Relay, ISDN, ATM or many other protocols to establish a point-to-point connection. Over this connection there are several tunnelling methods available to package and send the data, some of these include: HTTP/HTML, HTTP/XML, HTTP/Proprietary, FTP, SMTP or some other proprietary data exchange protocol. The type of host systems 25 that might employ the wireless router 26 to perform push could include: field service applications, e-mail services, stock quote services, banking services, stock trading services, field sales applications, advertising messages and many others. This wireless network 20 abstraction is made possible by the wireless router 26, which implements this routing and push functionality. The type of user-selected data items being exchanged by the host could include: E-mail messages, events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 25, or that the host system 25 acquires through the use of intelligent agents, such as data that is received after the host system 25 initiates a search of a database or a website or a bulletin board.

The wireless router 26 provides a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the existing and upcoming third-generation (3G) and fourth generation (4G) networks like EDGE, UMTS and HSDPA, LTE, Wi-Max etc. Some older examples of data-centric networks include, but are not limited to: (1) the Mobitex Radio Network ("Mobitex") and (2) the DataTAC Radio Network ("DataTAC").

To be effective in providing push services for host systems 25, the wireless router 26 may implement a set of defined functions. It can be appreciated that one could select many different hardware configurations for the wireless router 26, however, many of the same or similar set of features would likely be present in the different configurations. The wireless router 26 may offer any one or more of the following features for host services: 1) An addressing method so that mobile device 10 traffic can be addressed to a host system 25 without the need for the wireless network 20 to assign an identity to each host system 25; 2) An efficient and authenticated method for the host system 25 to initiate a communication connection to the wireless router 26 for the purposes of opening a communication tunnel to the one or more mobile devices 10 that the host system 25 wishes to communicate with; 3) A reliable method for exchanging data between the host system 25 and the mobile device 10, in a manner consistent with the abilities of the wireless network 20; 4) Providing feedback to the host system 25 when data is delivered, which allows the host system to clean up any wireless delivery queues if necessary, or inform the original sender (user or program) that the data has been delivered to the mobile device 10; 5) Implementation of a wireless network 20 initiated push of services or data to a mobile device 10, from a wireless router 26; and 6) Connect to a wide range of wireless networks 20 and provide a way of tracking the user's location so that a 'follow you anywhere' solution can be provided.

Figure 3:
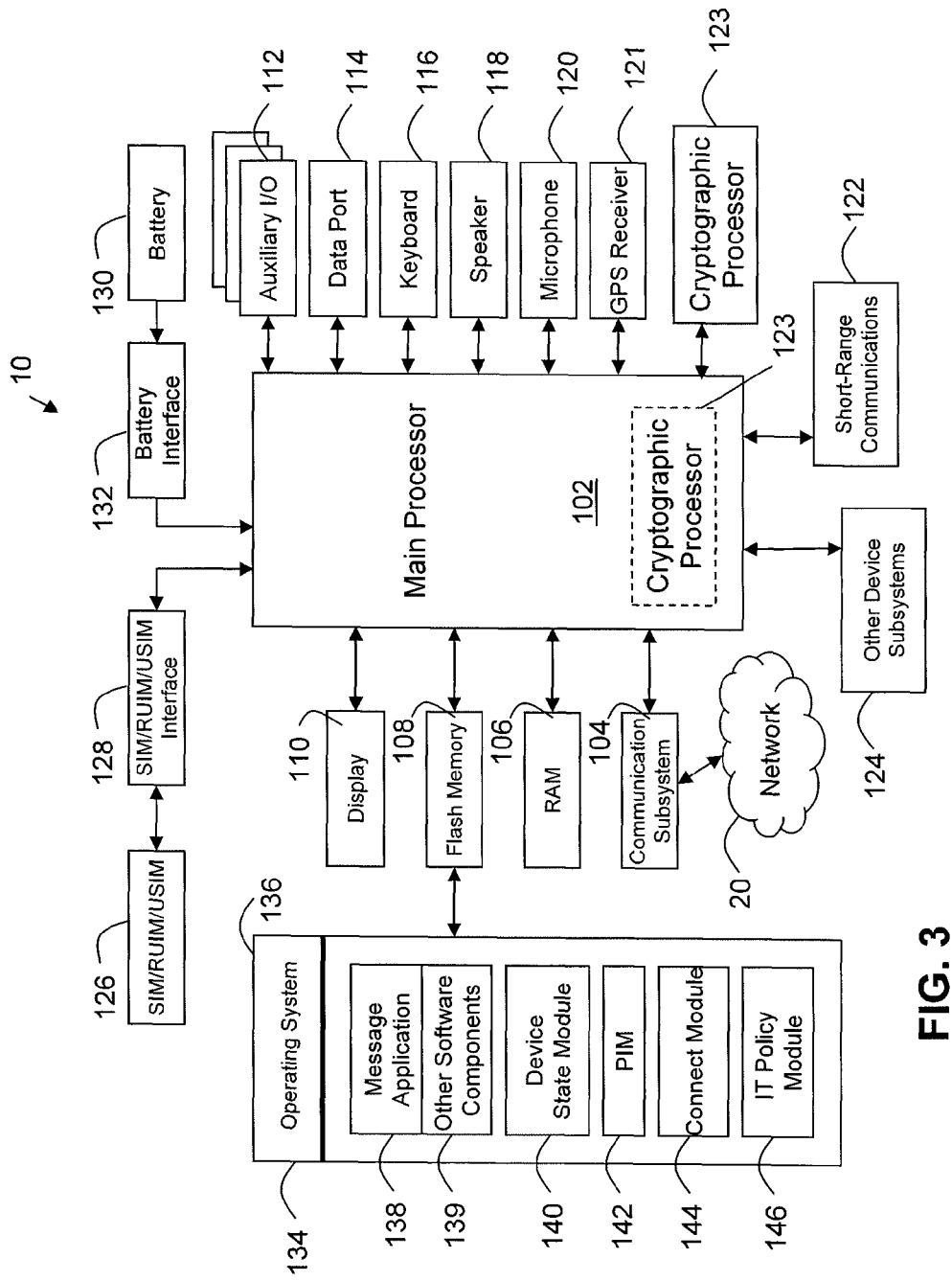
FIG. 3 is a block diagram of an example embodiment of a mobile device.
Figure 4:
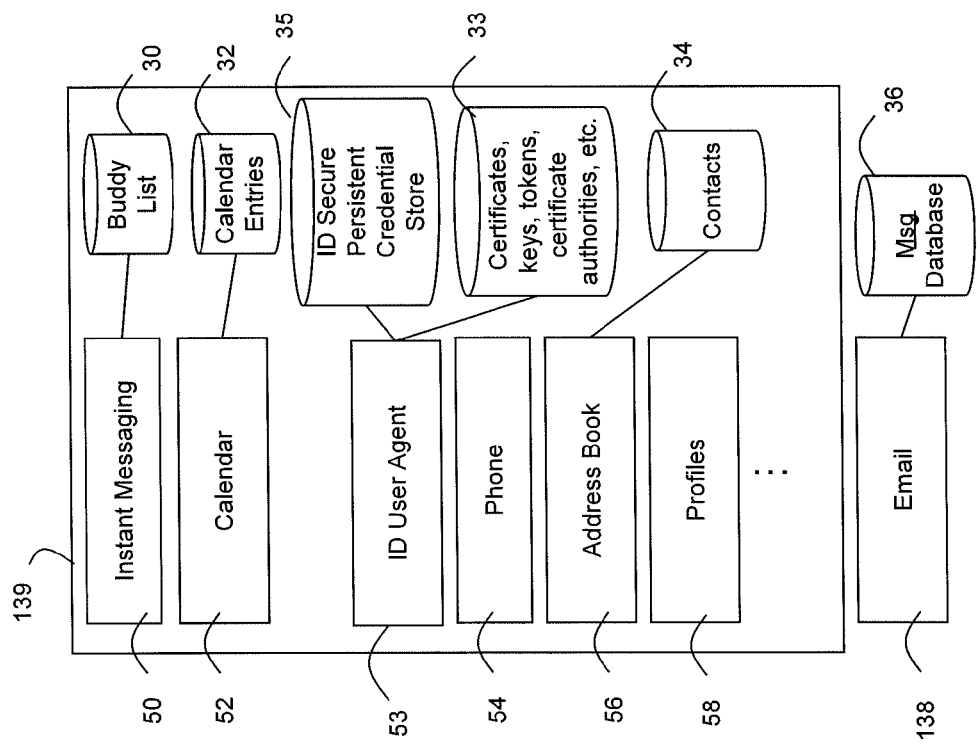
FIG. 4 is a block diagram illustrating example ones of the other software applications and components shown in FIG. 3.

An example configuration for the mobile device 10 is illustrated in FIGS. 3-4. Referring first to FIG. 3, shown therein is a block diagram of an example embodiment of a mobile device 10. The mobile device 10 comprises a number of components such as a main processor 102 that controls the overall operation of the mobile device 10. Communication functions, including data and voice communications, are performed through a communication subsystem 104. It is appreciated however, that the mobile device 10 does not necessarily have voice communication capabilities, such as in tablets and e-readers, amongst others. The communication subsystem 104 receives messages from and sends messages to a wireless network 20. In this example embodiment of the mobile device 10, the communication subsystem 104 is configured in accordance with the GSM and GPRS standards, which are used worldwide. Other communication configurations that are equally applicable are the 3G and 4G networks discussed above. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 20 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124. As will be discussed below, the short-range communications 122 can implement any suitable or desirable device-to-device or peer-to-peer communications protocol capable of communicating at a relatively short range, e.g. directly from one device to another. Examples include Bluetooth®, ad-hoc WiFi, radio frequency identification (RFID), near field communications (NFC), infrared, or any "long-range" protocol re-configured to utilize available short-range components. It will therefore be appreciated that short-range communications 122 may represent any hardware, software or combination of both that enable a communication protocol to be implemented between devices or entities in a short range scenario, such protocol being standard or proprietary.

Some of the subsystems of the mobile device 10 perform communication-related functions, whereas other subsystems may provide "resident" or on-device functions. By way of example, the display 110 and the keyboard 116 may be used for both communication-related functions, such as entering a text message for transmission over the network 20, and device-resident functions such as a calculator or task list.

The mobile device 10 can send and receive communication signals over the wireless network 20 after required network registration or activation procedures have been completed. Network access is associated with a subscriber or user of the mobile device 10. To identify a subscriber, the mobile device 10 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 10 may not be fully operational for communication with the wireless network 20. Once the SIM/RUIM/USIM 126 is inserted into the SIM/RUIM/USIM interface 128, it is coupled to the main processor 102. It can be appreciated that in other example embodiments of the mobile device 10, a SIM/RUIM/USIM card is not required, such as in tablets, e-readers, laptops, etc.

The mobile device 10 is typically a battery-powered device and in this example includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

In the examples described herein, the mobile device 10 comprises or otherwise has access to a cryptographic processor 123 which can be embodied in hardware, software, or a combination of the two. Also, as will be discussed below, the cryptographic processor 123 may control a user agent 53 (shown in FIG. 4) which may represent a cryptographic or security related application that cryptographically processes data. The mobile device 10 may also comprise internal or external memory or other computer readable media for storing computer executable instructions for enabling the cryptographic processor 123 to perform cryptographic operations as is known in the art. As can be seen in FIG. 3, the cryptographic processor 123 may be independent of the main processor 102 in a mobile device configuration, or may be implemented by special instructions or hardware associated with the main processor 102 itself.

The mobile device 10 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Software applications may include a message application 138, a device state module 140, a Personal Information Manager (PIM) 142, a connect module 144 and an IT policy module 146. A message application 138 can be any suitable software program that allows a user of the mobile device 10 to send and receive electronic messages, wherein messages are typically stored in the flash memory 108 of the mobile device 10. A device state module 140 provides persistence, i.e. the device state module 140 ensures that important device data is stored in persistent memory, such as the flash memory 108, so that the data is not lost when the mobile device 10 is turned off or loses power. A PIM 142 includes functionality for organizing and controlling data items of interest to the user, such as, but not limited to, e-mail, text messages, instant messages, contacts, events, and voice mails, and may interact with the wireless network 20. A connect module 144 implements the communication protocols that are required for the mobile device 10 to communicate with the wireless infrastructure and any host system 25, such as an enterprise system, that the mobile device 10 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 10. These software applications 139 can include pre-installed applications (i.e. other than message application 138) and third party applications, which may be added after the manufacture of the mobile device 10. Examples of the applications 139 include games, calculators, utilities, social media applications, shopping applications, banking and other financial applications, additional messaging applications, etc. The additional applications 139 can be loaded onto the mobile device 10 through at least one of the wireless network 20, the auxiliary I/O subsystem 112, the data port 114, the short-range communications subsystem 122, or any other suitable device subsystem 124.

The data port 114 can be any suitable port that enables data communication between the mobile device 10 and another computing device. The data port 114 can include a serial or a parallel port. In some instances, the data port 114 can include a USB port that includes data lines for data transfer and a supply line that can provide a charging current to charge the battery 130 of the mobile device 10.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

For composing data items, such as e-mail messages, for example, a user or subscriber could use a touch-sensitive overlay (not shown) on the display 110 that is part of a touch screen display (not shown), in addition to possibly the auxiliary I/O subsystem 112. The auxiliary I/O subsystem 112 may include devices such as: a mouse, track ball, track pad, infrared fingerprint detector, or a roller wheel with dynamic button pressing capability. A composed item may be transmitted over the wireless network 20 through the communication subsystem 104.

FIG. 4 shows an example of the other software applications and components 139 that may be stored on and used with the mobile device 10. Only examples are shown in FIG. 4 and such examples are not to be considered exhaustive. In this example, an instant messaging application 50, calendar application 52 (or other event related organizer), a user agent 53, phone application 54, address book 56 and a profiles application 58 are shown to illustrate the various features that may be provided by the mobile device 10. Also shown in FIG. 4 is the message application 138, which in the following will be referred to as an email application 138 for clarity and stores or otherwise has access to a message database 36 for storing incoming and outgoing messages as well as those stored in various folders. It will be appreciated that the various applications may operate independently or may utilize features of other applications. For example, the phone application 54 and email application 138 may use the address book 56 for contact details obtained from a list of contacts 34.

The instant messaging application 50 is an instant messaging service that may hosted and provided by the host system 25, e.g. using a messaging server at the wireless router 26 or may be associated with a third party instant messaging service (not shown). The instant messaging application 50 comprises or otherwise has access to contact information often referred to as a "buddy" list 30. The calendar application 52 comprises or otherwise has access to a portion of memory, database or other data storage device storing calendar entries 32, which may include any data or information associated with a particular date and time in the calendar application 52 and may be displayed in a graphical user interface (GUI) therefor. It can be appreciated that such software applications and components 139 may require one or more operational certificates 33 to operate or function on the mobile device 10.

Continuing with FIG. 4, the user agent 53 comprises or otherwise has access to a portion of memory, database or other data storage device for cryptographic data 33, which may include any data or information associated with cryptographic functions. In particular, the stored data 33 includes, for example, certificates, tokens, public and private keys, and a listing of certificate authorities.

The user agent 53 also has access to the ID secure persistent credential storage 35. This data includes credential information that is highly sensitive. For example, in a mobile banking application, the credentials stored are the verification code and PIN number. In government related client applications, the credentials stored are a person's the social security number or social insurance number.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, identity provider 206, client service 208, etc., or accessible or connectable thereto. Any application or module herein described may be implemented using computer readable/executable instructions that may be stored or otherwise held by such computer readable media.

A number of figures are discussed below with respect to the method of establishing and managing the personal identity information.

Figure 5:
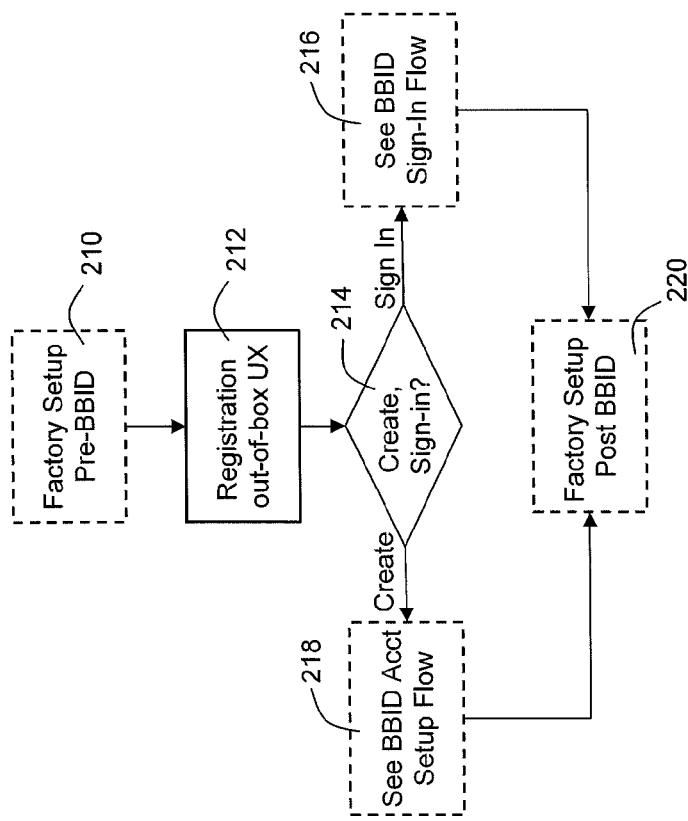
FIG. 5 is a flow diagram illustrating example computer executable instructions for establishing a user identity during the factory process.

Turning now to FIG. 5, example computer executable instructions are provided for establishing a user identity when the mobile device 10 is a new mobile device. For example, when the mobile device 10 comes "out of the box", it is when a user first purchases a new mobile device 10 and takes the mobile device 10 out of its box. At block 210, information and software libraries for the identity account are installed onto the mobile device 10 during the factory setup. However, at this stage, the user's identity has not been created or registered.

It is appreciated that the user identity is, in some cases, referred to in the drawings as BBID. The term BBID refers to BlackBerry ID. However, more generally, BBID is the user identity, and the principles described herein apply to managing identity information on various types of mobile devices.

At block 212, the mobile device 10 provides one or more GUI's to facilitate registering a user's identity when the user first turns on the mobile device 10. It is determined if the user would like to create a new user identity account or would like to sign-in to an existing user identity account (block 214). If the user selects the option to sign-in, then at block 216, the sign-in process is invoked. Otherwise, if the user selects the option to create a new user identity account, at block 218, the account setup process is invoked. After the user ID has been established and the user has signed into the user account, there may be further setup operations (block 220). At block 220 there are other system setup operations that take place, such as setting up email, downloading the user agent 53, etc. When the overall setup is done, the system downloads the actual running image and reboots. The running image, for example, refers to the software installed after the first setup. In an example embodiment, the version of the running image that is downloaded is considered to be the latest or most recent version.

Figure 6:
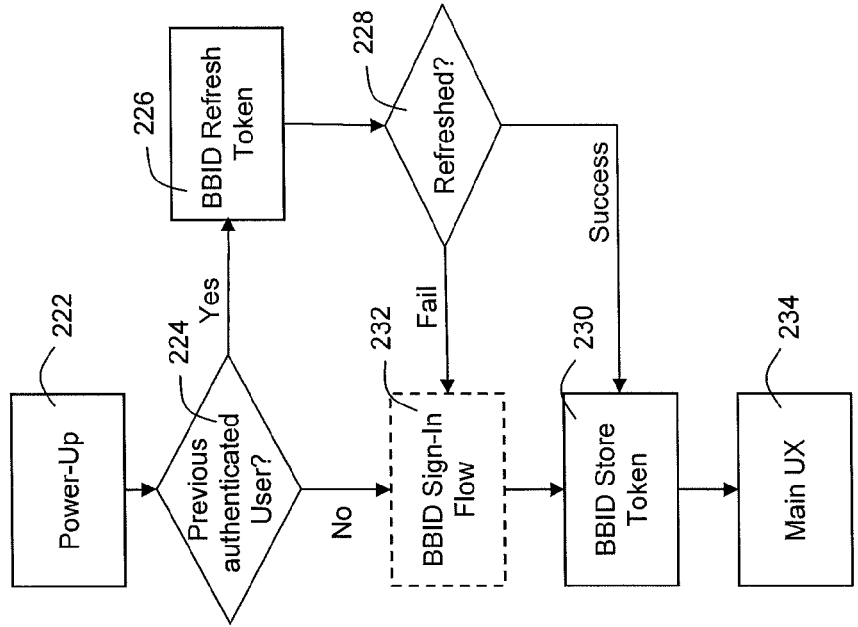
FIG. 6 is a flow diagram illustrating example computer executable instructions for establishing a user identity upon powering up a mobile device.

The process for establishing the user identity is different when powering up a mobile device 10 in a non-factory setting, for example, when the user has already been the owner of the mobile device 10 for some time, or there is a previous owner of the mobile device 10. Turning to FIG. 6, at block 222, the mobile device 10 is powered-up, or turned on. At block 224, it is determined if there is a previously authorized or authenticated user having user identity information associated with the mobile device 10. This user identity information would be known to the user agent 53. If not, at block 232, the user identity sign-in process is invoked. From the sign-in process, an identity token is created and stored on the mobile device 10 (block 230). If, however, there is a previously authorized user, at block 226, the previously authorized user's identity token is refreshed. If the token is successfully refreshed, the refreshed token is stored (block 230). If the token is not able to be refreshed, then the sign-in process is invoked (block 232).

Upon storing the token, the GUI returns to a main screen provided by the user agent 53 or the client application's screen (block 234).

Figure 7:
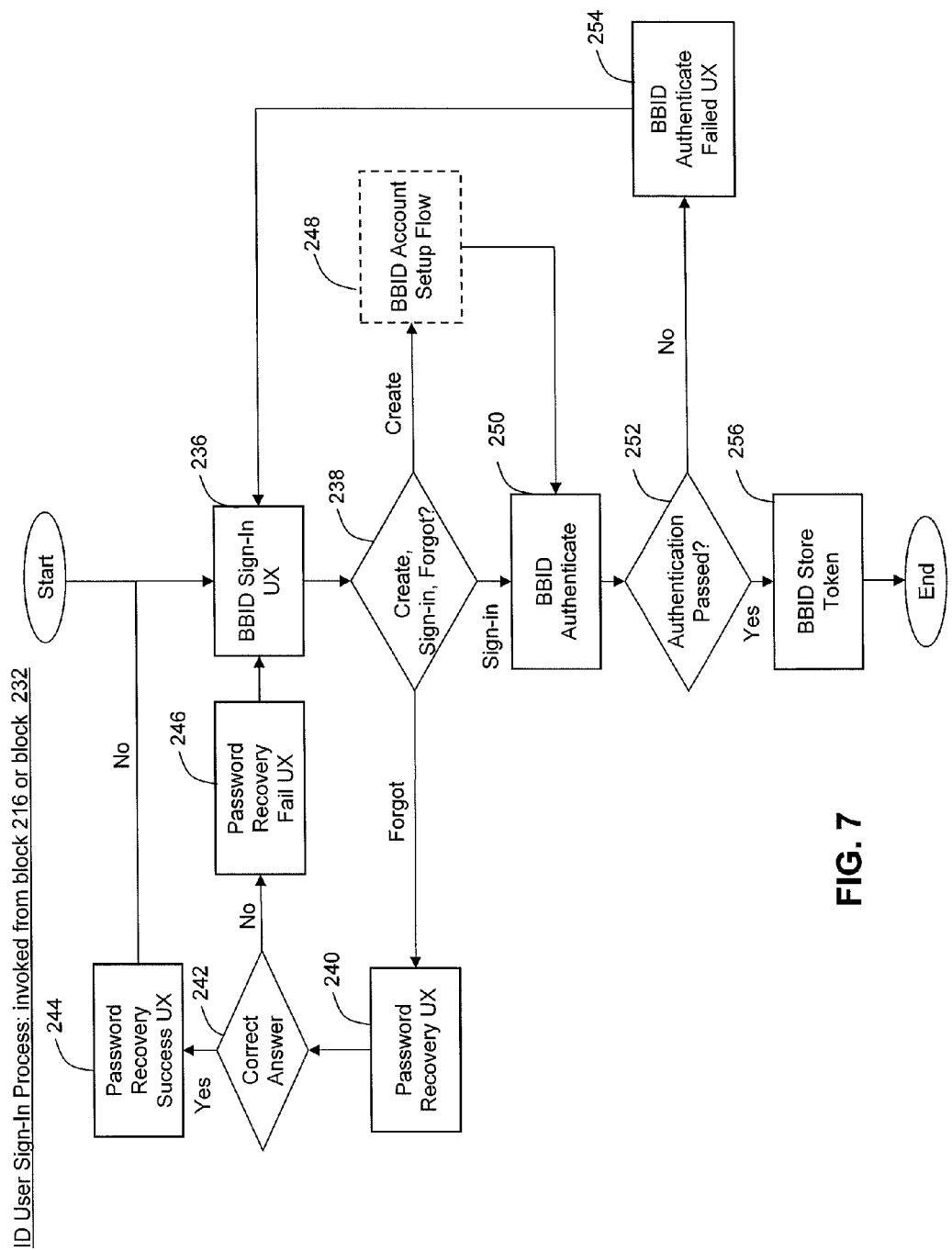
FIG. 7 is a flow diagram continuing from FIG. 6 illustrating example computer executable instructions for signing in a user according to their user identity.

Turning to FIG. 7, example computer executable instructions are provided for signing into a user identity account. At block 236, the mobile device 10, through the user agent 53 displays a sign-in GUI. The options provided include creating a new user identity account, signing into an existing user identity account, or retrieving access information if the user identity sign-in information is forgotten (block 238).

If the user 200 selects the 'forgot' option, at block 240, the password recovery GUI is invoked. One or more secret questions may be provided to confirm the identity of the user. If the correct answer or answers are provided (block 242), then the successful password recovery GUI is invoked (block 244). Otherwise, the failed password recovery GUI is invoked (block 246), and the process returns to block 236.

If the user 200 selects the 'sign-in' option, at block 250, the user's identity information is authenticated. For example, a user enters a username and password into the mobile device 10, and the mobile device 10 confirms if the provided information is correct. If the authentication process has passed (block 252), then an identity token is created and stored (block 256). If the authentication process has failed (block 252), then a GUI showing that the failed authentication is displayed (block 254) and the process returns to block (236).

If the user 200 selects the 'create' option, at block 248, the identity account setup process is invoked. Upon creating the account, the sign-in process begins, continuing with block 250.

Figure 8:
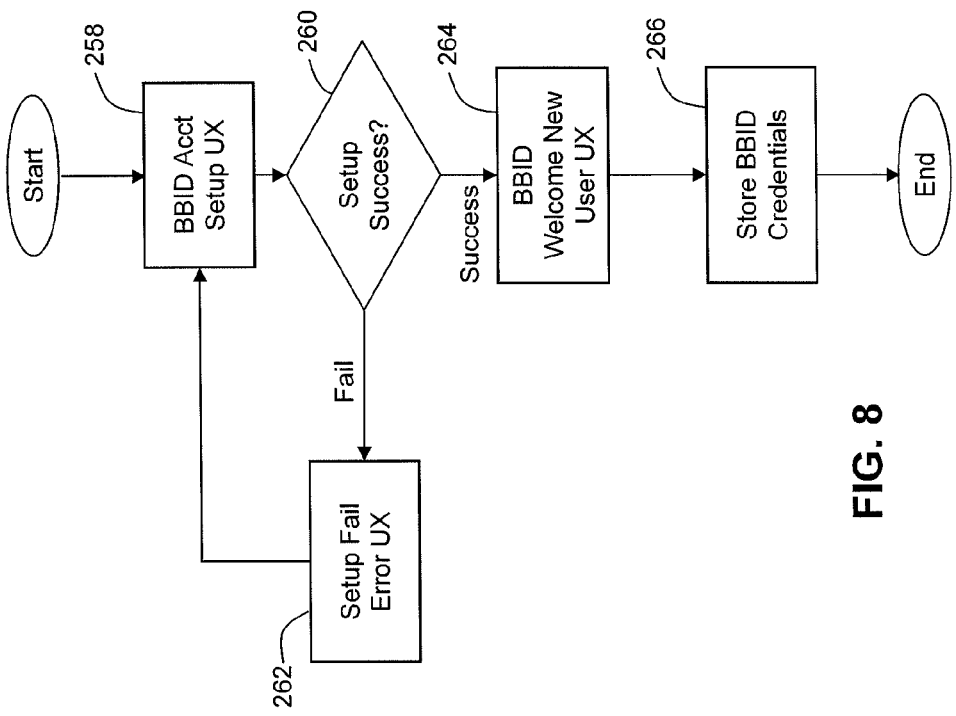
FIG. 8 is a flow diagram continuing from FIG. 7 illustrating example computer executable instructions for registering a user identity account.

FIG. 8 provides example computer executable instructions for registering a new user identity account. At block 258, a GUI is displayed for the identity account setup. The mobile device 10 poses a number of questions and receives account information (e.g. username, passwords, secret questions), which also includes the user's identity information (e.g. contact information, personal information, first name, middle name, last name, birth date, sex, address, phone number, email address, citizenship, etc.) from the user 200. At block 260, it is determined if the setup process has been a success. The identity provider 206 may verify the account information. The identity provider 206 stores the account information, including the user's identity information. If the identity provider 206 cannot be reached by the mobile device 10 or the identity provider 206 determines that the same account already exists, then the setup fails. If the setup has failed, at block 262, a GUI is displayed stating that there has been setup error or failure. The process then returns to block 258. If the setup is successful, at block 264, a GUI is displayed welcoming the new user. The new user's credentials (e.g. username and password) are stored, for example, in the ID secure persistent credential store 35.

Figures 9, 10:
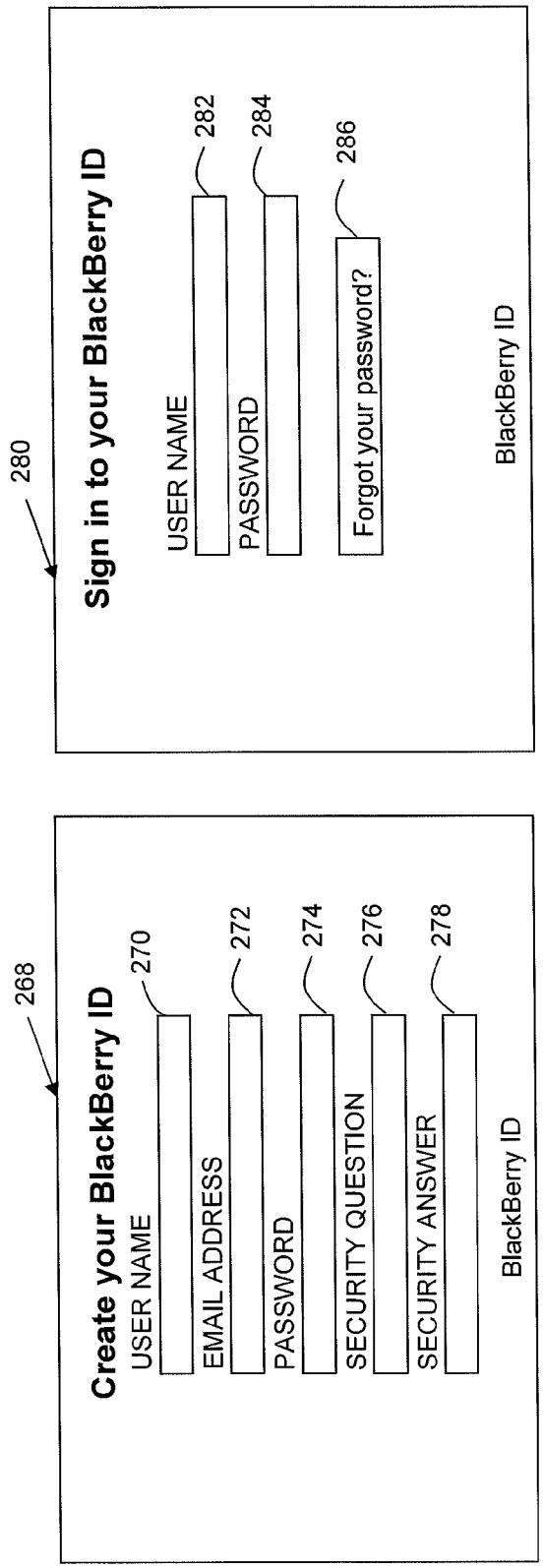
FIG. 9 is an example graphical user interface (GUI) for creating a new user identity.
FIG. 10 is an example GUI for creating signing into a user account using the user identity.

FIG. 9 provides an example GUI 268 used to obtain information from a user 200 to create a new user identity account. There are multiple text fields that allow a user to enter in his/her user name 270, email address 272, passwords 274, security questions 276, and security answer 278. There may be additional fields to receive other types of user identity information.

FIG. 10 provides an example GUI 280 used to obtain the user name 282 and password 284 when a user signs into user identity account. A 'forgot your password' button 286 is also provided to invoke the process of recovering a user's password.

Figure 11:
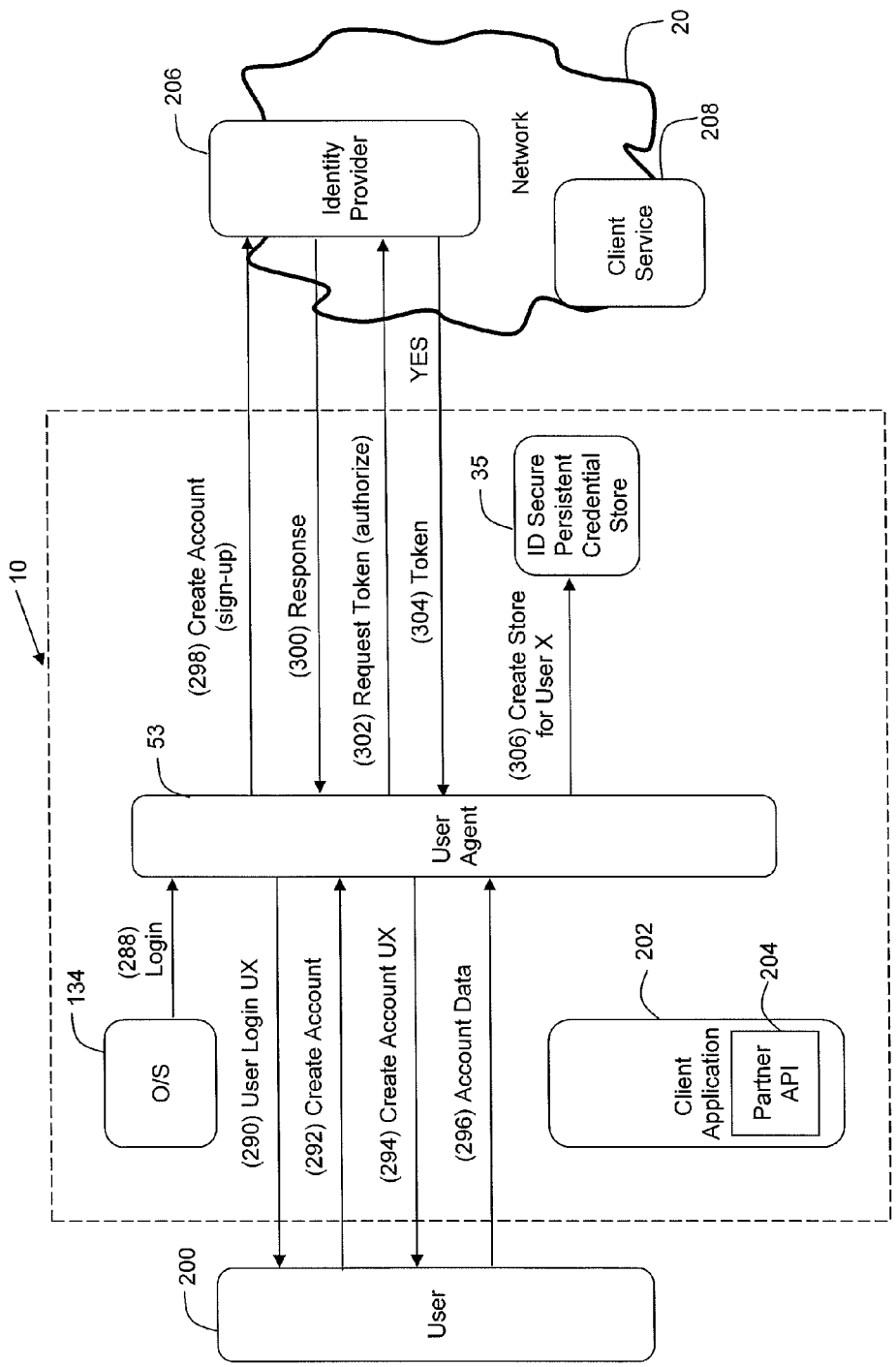
FIG. 11 is a flow diagram illustrating example computer executable instructions for creating a user identity account.

Turning to FIG. 11, example computer executable instructions and system are provided for creating a user identity. At 288, the operating system 134 triggers the user identity login process. The process is performed by the user agent 53. At 290, the user agent 53 displays a login GUI on the display 110 of the mobile device 10. At 292, the mobile user agent 53 receives an indication from the user 200 to create a new user identity. At 294, the user agent 53 displays a GUI, to create new user identity account, on the mobile device 10. At 296, the user agent 53 receives the account data (e.g. user name, password, etc.) and the user identity information. At 298, the user agent 53 contacts the identity provider 206 to create a new user identity. At 300, the identity provider 206 responds with its status. The status information includes indicating whether an account exists, or if there are general server processing errors, or if the request for a user identity is accepted. If the identity provider 206 responds that the request is accepted, at 302, the user agent 53 sends the user's credentials to the identity provider 206. The identity provider 206 checks the credentials to determine their authenticity and accuracy. Non-limiting examples of credentials include username, password, facial recognition, speech recognition, biometric feature(s), etc. If the credentials are successfully verified, then the identity provider 206 issues an identity token to the user agent 53 (304). The token has an expiry date, to ensure that identity and credential information is updated or refreshed periodically. The token is periodically refreshed by the user agent 53 re-submitting credentials (e.g. username and password) to the identity provider 206. If authentication fails, the user is prompted again to submit the credentials. At 306, the identity username and password, as well as the token issued by the identity provider, is stored in the ID secure persistent credential store 35.

Usefully, user agent 53 is able to automatically refresh the token (e.g. by contacting the identity provider 206) without prompting the user. Furthermore, in an example embodiment, only the identity provider 206 is able to extract and use the token stored on the ID secure persistent credential store 35.

Figure 12:
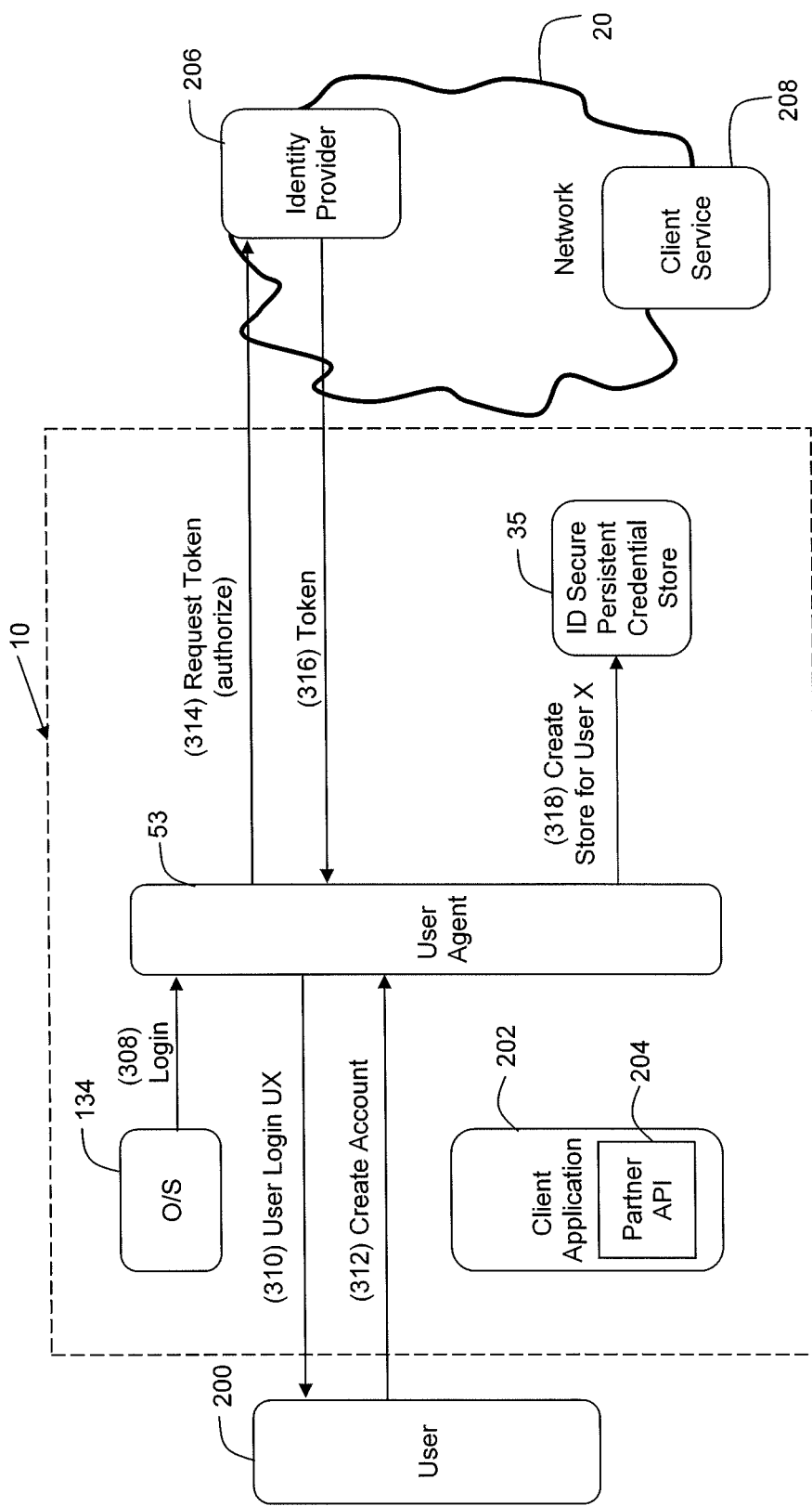
FIG. 12 is a flow diagram illustrating example computer executable instructions for logging into a user identity account.

Turning to FIG. 12, example computer executable instructions and system are provided for allowing a user to log into the user agent 53. At 308, the operating system 134 on the mobile device 10 triggers the user identity login process at the user agent 53. The operating system 134 can trigger this action when powering-up the mobile device 10 having no previous user, or when setting up the mobile device 10 having no previous user. The user sign-in process is persistent across power cycles. In other words, if the user has signed-in on the mobile device 10 at least once on a previous occasion, for future occasions, for example, the user does not need to sign-in every time when powering the mobile device 10 on and off.

At 310, the user agent 53 displays a user login screen (e.g. display GUI 280) on the mobile device's display 110. At 312, the mobile device 10 receives from the user 200 their credentials, such as their username and password. At 314, the user's credentials are forwarded from the user agent 53 on the mobile device 10 to the identity provider 206. The identity provider 206 verifies whether the credentials are correct. If the credentials are successfully verified, at 316, the identity provider 206 generates a user identity token and returns the token to the mobile device 10. If the credentials provided fail in the verification process, then the mobile device 10 prompts the user 200 again to provide the credentials.

At 318, upon the mobile device 10 receiving a token from the identity provider 206, a secure credential store for the user 200 is created. The user's username, password and token are stored in the secure credential store 35. The token stored in the secure credential store 35 is refreshed by the user agent 53 and the identity provider 206 without prompting the user 200. The identity provider 206 has access to extract and use the token on the mobile device 10, through the user agent 53. Other applications, such as the client application 202 on mobile device 10, or the client service 208, are not able to access the token.

Figure 13:
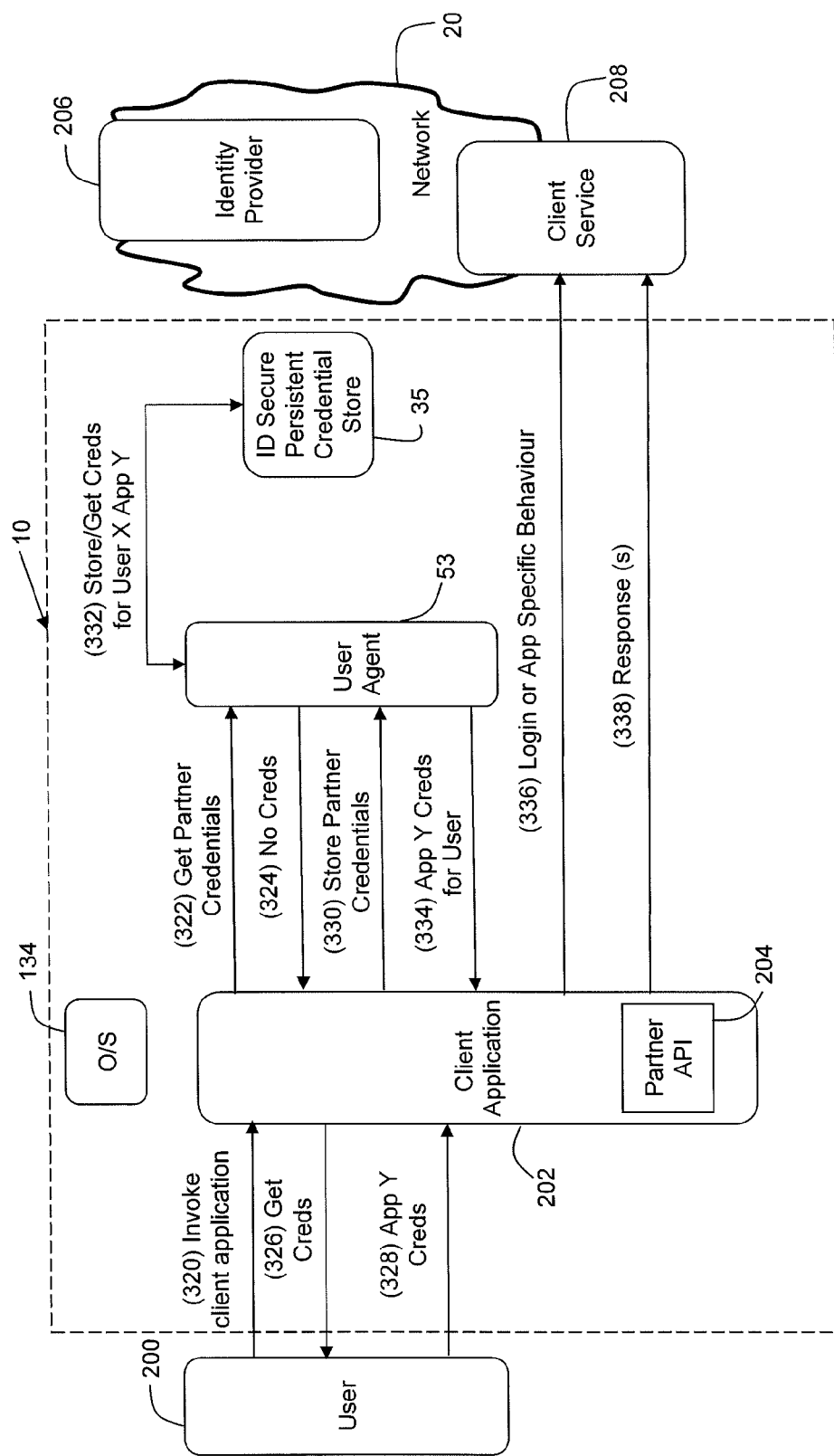
FIG. 13 is a flow diagram illustrating example computer executable instructions for a client application logging on to a client service using the user identity account.

FIG. 13 provides example computer executable instructions and system for a client application 202 or client service 208, or both, logging onto the user agent 53. This allows the client application 202 or client service 208 to retrieve the user's information through the user agent 53. For example, in order for a user 200 to login into the Facebook™ server (e.g. a client service 208) through the mobile device's Facebook™ application (e.g. client application 202), the user 200 must enter their Facebook™ username and password into Facebook™ application. The proposed systems and methods allows a user 200 to enter in their Facebook™ credentials, associate the Facebook™ credentials with their user identity, and store their Facebook™ credentials on the ID secure persistent credential store 35. This process can be used for various other client applications. In this way, when a user 200 logs into the user agent 53 using their user identity, the user agent 53 also logs into all the associated client applications 202. This usefully allows a user 200 to use a single sign-on action to sign into multiple other applications. It can be appreciated that Facebook™ is only an example client application and that other applications can be used.

It can be understood that the ID secure persistent credential store 35 can store the credentials for logging into the user agent 53 (e.g. username and password), the token, and the credentials for the client application or the client applications.

It is appreciated that each client application 202 includes a partner API 204 that allows the client application 202 to interface or communicate with the user agent 53.

In FIG. 13, it is assumed that the user 200 is already signed into the user agent 53 using their user identity. At 320, the user 200 invokes the client application 202, such as by opening the client application 202. Alternatively, the partner API 204 autonomously initiates a request for the user identity credentials associated with the user agent 53.

At 322, if the client application 202 is not already logged into by the user 200, the partner API 204 requests the user's credentials (e.g. username and password) from the user agent 53. If the client application 202 is already associated or registered with the user agent 53, then the user's credentials for the client application 202 will be stored in the ID secure persistent credential store 35, and retrievable through the user agent 53. If the client application 202 is not already associated or registered with the user agent 53, then the user's credentials for the client application must be obtained and then stored in the ID secure persistent credential store 35.

Usefully, the client application 202 can only access the credentials associated with the client application 202 that have been stored on the ID secure persistent credential store 35. The client application 202 has a public key and corresponding private key, which is provided by the partner API 204. The client application's public key and private key pair is provided by the code signing authority. For example, when a client application developer signs up to develop an application for the mobile device 10, the developer receives from the code signing authority a signing key that is used to sign their files. The proposed system uses the signing key to determine identity of the client application 202.

At 324, if the user agent 53 determines that the credentials for the client application 202 have not been stored in the ID secure persistent credential store 35, then the user agent 53 sends a response to the partner API 204 that there no credentials for the client application 202. At 326, the partner API 204 displays a GUI on the display 110 to prompt the user 200 to provide the credentials for the client application 202. At 328, the mobile device 10 receives the credentials for the client application 202. The partner API 204 then requests the user agent 53 to store the credentials of the client application 202 (330). At 332, the user agent 53 stores the credentials for the client application 202 onto the ID secure persistent credential store 35. At 336, using the credentials for the client application 202, the client application 202 can then log into the client service 208 over the network 20 (334). The client service 208 can then return information back to the client application 202 on the mobile device 10 (338).

Alternatively, if the user agent 53 determines that the credentials for the client application 202 are stored in the ID secure persistent credential store 35, then the user agent 53 retrieves the credentials for the client application and provides them to the partner API 204. The client application 202 then uses the retrieved credentials (for the client application 202) to log into the client service 208 (336). It can be appreciated that in this latter scenario, in which the credentials for the client application 202 have already been stored on the mobile device 10, the user agent 53 can automatically log a user 200 into the client service 208 without requiring the user 200 to input any credentials. This conveniently saves time.

In another example embodiment, the identity provider 206 may also store user identity information (e.g. personal information) that is requested by the client service 208. The client service 208 may send a request for the user identity information data to the client application 202. The client application 202, through the partner API 204, forwards the request for user identity information to the user agent 53. The user agent 53 then forwards the request for user identity information along with the user identity token to the identity provider 206. Upon the identity provider 206 successfully authenticating the user identity token, the identity provider 206 provides the requested user identity information back to the user agent 53. The user agent 53 then sends the retrieved user identity information to the client application 202, which transmits the same to the client service 208. It can be appreciated that the user identity information may be encrypted by the identity provider 206, such that only the client service 208 can decrypt the encrypted user data.

In general, an example system and method are provided for managing user identity information on a mobile device. The system includes: the mobile device comprising a user agent and a client application, the user agent and the client application in communication with each other; an identity provider in communication with the mobile device, the user identity information stored on the identity provider; a client service in communication with the mobile device; and wherein the user agent is configured to communicate with the identity provider and retrieve the user identity information for the client application, and the client application is configured to transmit the user identity information to the client service.

In another aspect, the identity provider is a server, and the client service is another server. In another aspect, the system further comprises an application program interface (API) in association with the client application, the API configured to allow the client application to communicate with the client application. In another aspect, the mobile device comprises an operating system, the operating system configured to invoke the user agent when turning on the mobile device. In another aspect, the mobile device comprises multiple client applications, and the mobile device is configured to, upon signing into the user agent, sign into the multiple client applications. In another aspect, the mobile device further comprises a credential store configured to store at least user credentials, the credential store in communication with the user agent. In another aspect, the user credentials comprises a username and a password. In another aspect, the user agent is further configured to: display a graphical user interface, and receive through the GUI the user credentials; send the user credentials to the identity provider for verification; if the user credentials are verified, receiving a token from the identity provider; and store the token and the user credentials in the credential store. In another aspect, the client application is configured to: receive a request from the client service for the user identity information; forward the request and the token to the identity provider; and receive the user identity information from the identity provider. In another aspect, the identity provider is configured to authenticate the token, and if authenticated, the identity provider is further configured to send the user identity information to the identity provider. In another aspect, the credential store is further configured to store credentials for the client application. In another aspect, to sign into the client application, the user agent is further configured to retrieve from the credential store the credentials for the client application and send the credentials for the client application to the client application; and the client application is further configured to use the credentials for the client application to log into the client application.

It is also recognized that one or more client services corresponding to one or more client applications of the mobile device may not have, or want, the capability to authenticate users of the client service or compile user profile data of these users.

For example, a user may not trust a client application to have or communicate its user profile data, or the client application may assume that the user does not trust the client application with this user profile data.

In another example, the user may not trust the network, such as the internet or a wireless channel, over which user profile data would have been communicated between the client application and the client service.

It has been recognized that in order to address the above problems, a trusted user agent and trusted identity provider may enable secure communication of user profile data to client services. The user may prefer to enable the trusted identity provider to provide only required user profile data to client services without exposing the user profile data to client applications.

Such a secure communication method prevents a client application, which may be untrusted, from obtaining user profile data while enabling a user to utilize a client service corresponding to that client application.

Furthermore, such a secure communication method enables a user to utilize a plurality of such client services without requiring manually providing user profile data to each of the plurality of such client services.

In one aspect, a system and method for secure communication of data to a service are provided.

Figure 14:
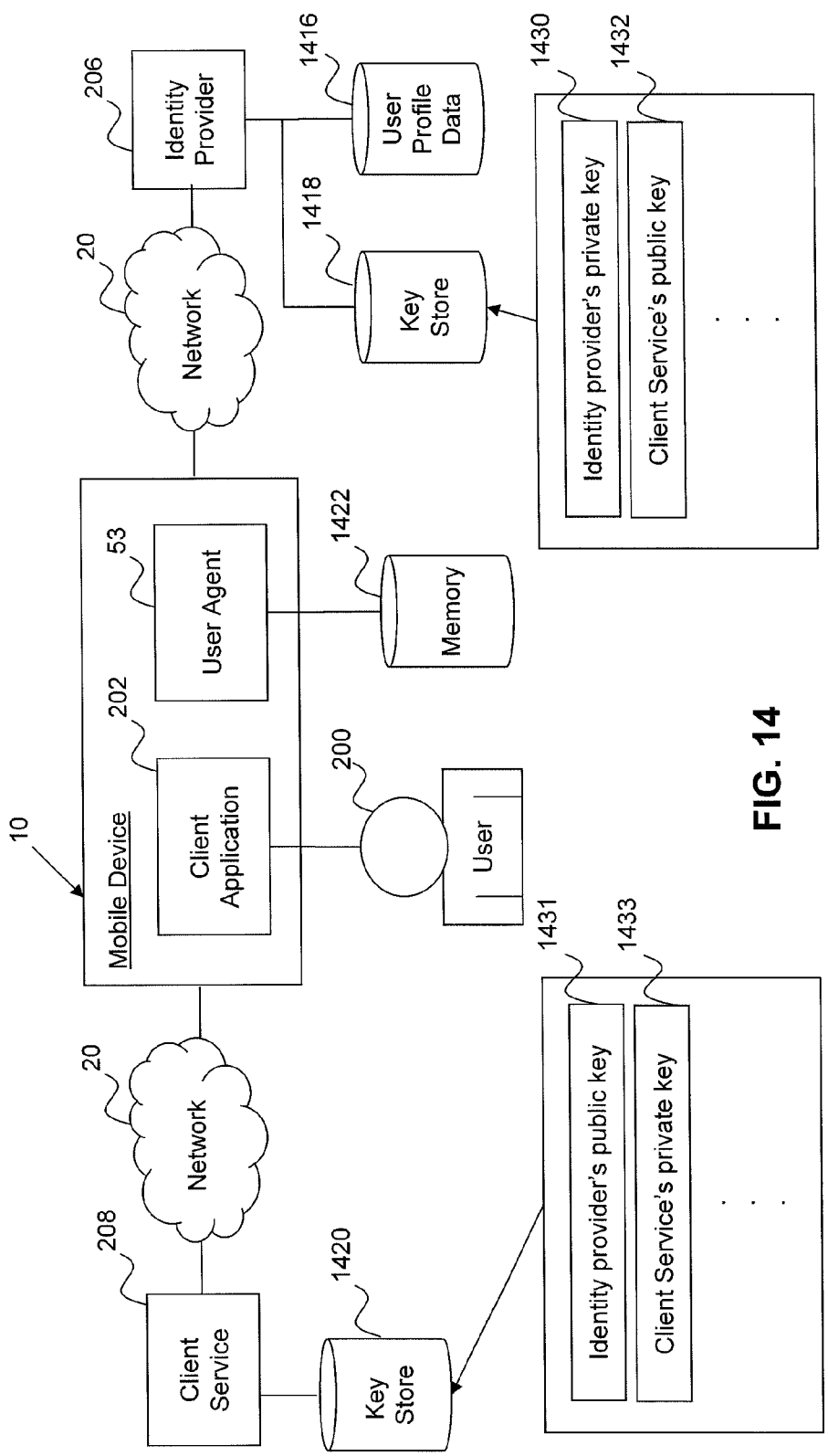
FIG. 14 is a block diagram illustrating a system for secure communication of data to a client service.

In another example embodiment of the identity management system, and referring to FIG. 14, the system comprises a mobile device 10 on which a user 200 can be authenticated, the mobile device 10 comprising a user agent 53 and one or more client applications 202. The system also includes an identity provider 206 operable to establish network communication with the user agent 53 over the network 20, and one or more client services 208 operable to establish network communication with the client application 202 over the network 20 (or another network). The identity provider 206 is linked to a user profile database 1416 configured to store user profile data associated with the user 200.

The client service 208 requests user profile data from the client application 202 and, in response, an encrypted token comprising user profile data and a token secret is generated by the identity provider 206 and communicated to the client service 208 for decryption. The token secret is also communicated to the client application 202 to provide proof of ownership of the token secret, which can be provided to the client service 208 to validate the token. The client application 202 does not require knowledge of any user profile data in order for the client service 208 to validate the user profile data.

The identity provider 206 may be linked to a key store 1418 and each client service 208 may each be linked to a key store 1420, each key store 1418, 1420 operable to store encryption keys. The encryption keys may be provided in accordance with a public key infrastructure (PKI) encryption scheme and, more particularly, may be provided in accordance with an elliptic curve cryptographic (ECC) scheme.

For example, the identity provider 206 is associated with the encryption key pair comprising an identity provider's public key 1431 and corresponding private key 1430. The client service 208 is associated with the encryption key pair comprising a client service's public key 1432 and corresponding private key 1433. The identity provider's private key 1430 and the client service's public key 1432 are stored on the key store 1418. The identity provider's public key 1431 and the client service's private key 1433 are stored on the key store 1420.

The user agent may include a memory 1422 for caching tokens or token secrets or both.

Figure 17:
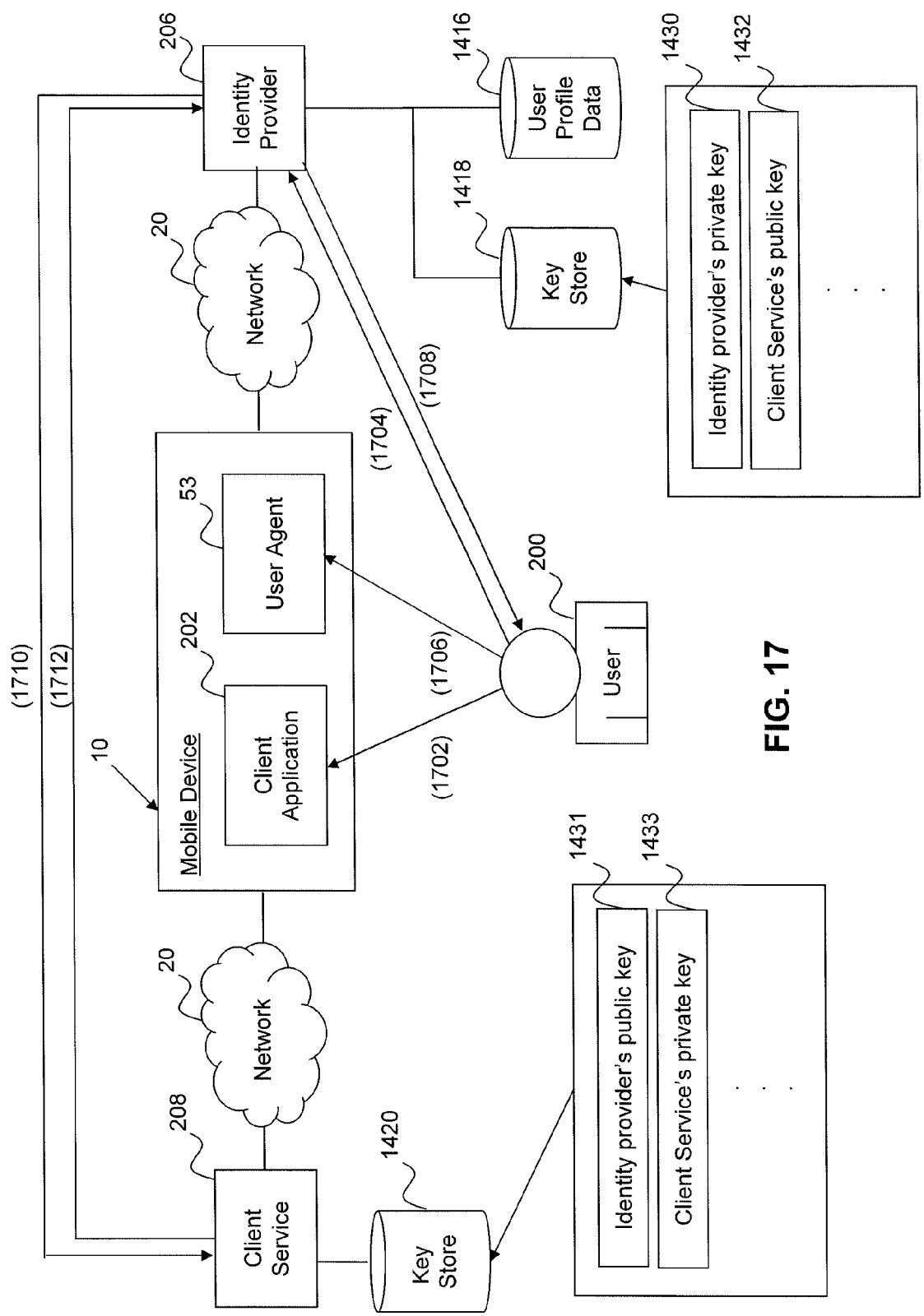
FIG. 17 is a block diagram illustrating trust relationships in accordance with the system FIG. 14.

Turning to FIG. 17, although the user may not trust the client application with user profile data, the user may trust the client application 1702 to interact with the client service on the user's behalf. The user may also trust the identity provider with the user's information 1704 and the user agent to impersonate the user 1706.

The identity provider correspondingly may trust the user 1708 based on the user's knowledge of appropriate credentials provided on the mobile device and known to the user agent. The identity provider may also trust the client service 1710 with the user profile data that it provides to the client service.

The client service may trust that the identity provider 1712 is providing the client service with correct user profile data that it requested. Such a trust can be established, for example, prior to an administrator of the identity provider enabling a particular client service to participate in the secure communication method.

Each particular client service may rely on the identity provider for user profile data including for authentication or compilation or both of user profile data, and may interface with the user agent to communicate requested user profile data to the client service.

Although the secure communication method may be applied to any number of one or more client services and one or more client applications corresponding to a mobile device having one or more users, for simplicity a single client service in communication with a single client application corresponding to a mobile device having one user will be described.

Figure 15:
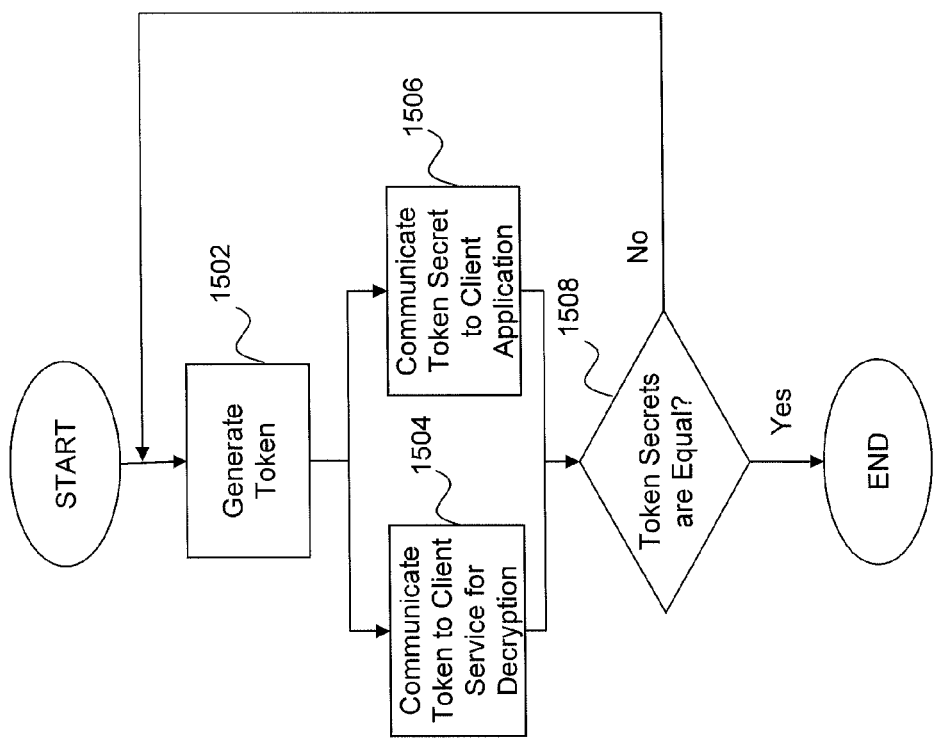
FIG. 15 is a flow diagram illustrating example computer executable instructions for secure communication of data to a client service.

In another aspect, and referring now to FIG. 15, the method comprises generating an encrypted token 1502 comprising user profile data and a token secret that is decryptable only by the client service 208, communicating the token 1504 to the client service for decryption, communicating the token secret 1506 to the client application, and verifying that the token secret communicated to the client application is equal to the token secret of the token 1508. If the token secret communicated to the client application is equal to the token secret of the token, then the client service can have a high confidence that the token includes the user profile data requested, and may use the user profile data as desired. In an example embodiment, if the token secret communicated to the client application is equal to the token secret of the token, the client service concludes or records that the token includes the user profile data requested and uses the user profile data. Otherwise, the steps 1502-1508 may be repeated or the client service may abandon the request for user profile data. It should be appreciated that steps 1504 and 1506 may be carried out concurrently or sequentially in either order. For example, execute 1504, then execute 1506; or execute 1506, then execute 1504; or asynchronously in either order.

Figure 16:
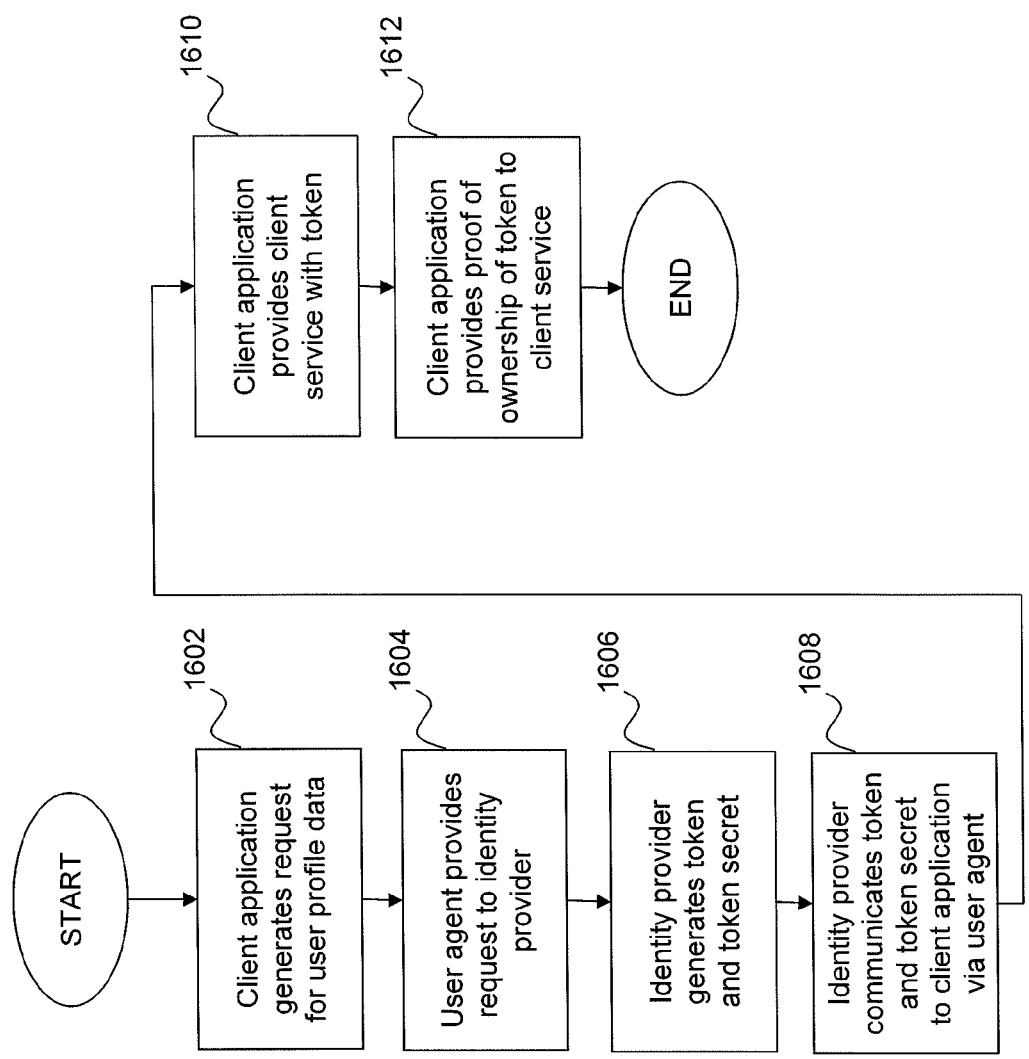
FIG. 16 is a flow diagram illustrating example computer executable instructions for another example embodiment of secure communication of data to a client service.

In another example embodiment, and referring now to FIG. 16, the method more specifically may comprise a client application generating a request to a user agent for user profile data 1602, the user agent providing the request to an identity provider 1604, the identity provider generating a token secret and an encrypted token 1606 comprising the user profile data and a token secret and communicating the token and token secret to the client application via the user agent 1608, the client application providing the client service with the token 1610 for decrypting the token, and the client application providing a proof of ownership of the token 1612, based on the token secret, to the client service to validate the user profile data.

Figure 18:
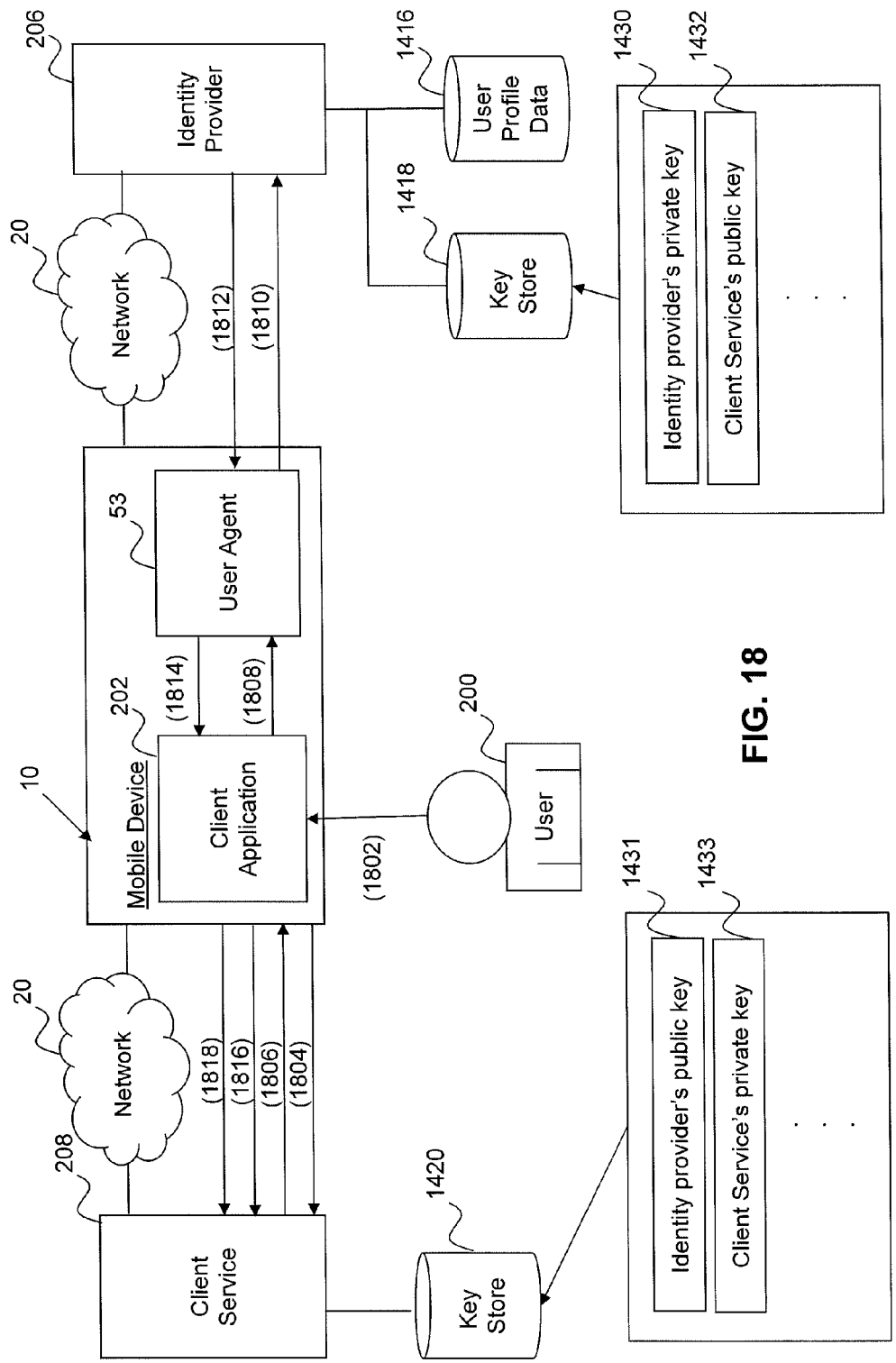
FIG. 18 is a flow diagram illustrating example computer executable instructions in accordance with the system.

Turning now to FIG. 18, a client service may request user profile data corresponding to a user, once the user is associated with a user account by the identity provider, as previously described. The user may be one of the one or more users presently authenticated to the mobile device, the present user being identifiable among the remaining users as previously described. The user agent is aware of which user is presently authenticated to the mobile device.

User profile data may comprise one or more claims. In an example embodiment, a claim comprises a fact about the user, which can be stated by another entity. The other entity which states the facts, or generates claims, is considered an authority and can also attest to the truth of the claim. Some claims are mandatory (e.g. must be included in the token), and other claims are optional (e.g. optionally included in the token). Examples of claims include a user identifier and a username. In an example embodiment, the user identifier in a claim is referred to as an ecoID. It is an identification that remains with the user across all devices belonging to the user. The ecoID also does not change. For example, although the user may change the username or the password, the ecoID does not change. The ecoID comprises, for example, a number.

In an example embodiment, the ecoID is a property within the token that will not change over time.

The user profile data may comprise an authentication status of the user, so as to enable authentication of the user on the particular client service requesting the user profile data, and user personal data that the identity provider or the user or both has authorized to be shared with the client service. It should be understood that the communication of user personal data from the identity provider to the client service does not necessarily include personally identifiable information about the user.

User profile data is requested by the client service from the identity provider, via the client application and user agent. For example, a user may access a client application 1802 on the mobile device. The client application corresponds to a client service. The client application may communicate with the client service to initiate use of the client service 1804. The client service may correspondingly issue a challenge to the client application 1806 requiring that the client application provide particular user profile data, such as authentication information to authenticate the user, for example, to the client service. However, the client application may not be trusted by the user with this user profile data.

The client application requests the user profile data, such as authentication information in this example, from the user agent 1808 and provides the user agent with a client application identifier. The user agent determines whether it has previously requested the particular user profile data for the particular user service and has cached a corresponding token and token secret.

If the user agent has not, it requests the user profile data from the identity provider 1810. Since the user agent is in possession of user credentials for the current user of the mobile device, the user agent can communicate all or part of the user credentials to the identity provider to inform the identity provider of which user the client service is inquiring. If the user agent has a cached corresponding token and token secret, it may not need to request the user profile data from the identity provider.

If requested, the identity provider generates an encrypted token that can be decrypted only by the client service, preventing the client application from accessing the user profile data. The token may comprise the user profile data, a token secret, and any other data, which is also referred to as metadata.

The token and token secret are provided by the identity provider to the user agent 1812, which the user agent may cache. The client application may request the token and token secret from the user agent.

Optionally, the user agent initiates a prompt to be provided to the user via a user interface of the mobile device. The prompt may request explicit consent from the user to enable the user agent to provide the token and token secret to the client application. If the user does not consent, the user agent does not release at least the token to the client application. If the user does consent, the user agent releases the token and token secret to the client application.

Communication of the token and token secret to the correct client application 1814 can be ensured by establishing security between each client application and the user agent. This can be by issuing, or recognizing an existing, certificate to verify the identity of any particular client application. Certificates may be administered by a certifying authority.

Alternatively, or in addition, the user agent may be configured to recognize a certain set of client applications and communicate securely with the certain set of client applications so as to prevent tokens and token secrets from being provided to client applications other than those intended.

The token and token secret may only be provided to the client application that has a client application identifier matching the client application identifier provided to the user agent at the time of the request. Upon receipt of the token and token secret from the user agent, the client application may then communicate the token to the client service 1816.

The client service decrypts the token to obtain the user profile data, metadata and token secret. The client service can also request that the client application communicate its copy of the token secret, or other proof of ownership of the token secret, to the client service 1818 for verifying that the client application is the particular client application that the client service wishes to rely upon, enabling the client service to rely on the received user profile data and metadata.

The identity provider may be operable to generate a specific token and token secret for each client application and corresponding client service. This can be provided by encryption.

Communication of the request for user profile data 1806 and corresponding communications of the token 1812, 1814, 1816 may be encrypted. The encryption may, for example, be provided by PKI that comprises a public key and corresponding private key. The particular PKI may be provided by ECC.

At least two public/private key pairs may be provided, a first key pair referred to herein as the client service encryption key pair and a second key pair referred to herein as the authentication token signing key pair.

The client service encryption key pair comprises a private key known only to a particular client service and a public key known at least by the identity provider. The client service may comprise a key store for storing the private key of the client service encryption key pair. The identity provider may comprise a key store for storing the public key of the client service encryption key pair. Each client service may be associated with a unique client service encryption key pair, and the identity provider's key store may store all public keys for all client services.

The authentication token signing key pair comprises a private key known only to the identity provider and a public key known by all client services. The key store of the identity provider may store the private key of the authentication token signing key pair. The key store of each client service may store the public key of the authentication token signing key pair.

The tokens and token secrets may be cacheable by the user agent for a predetermined amount of time to reduce the amount of communication required between the user agent and the identity provider and to enable services to receive user profile data when the mobile device is not connected by network to the identity provider. The token secret may be regenerated by the identity provider after the predetermined amount of time, which may be, for example, hours or days. When the token secret is regenerated, tokens must also be regenerated by the identity provider.

The authentication token signing key pair and the client service encryption key pair may also be regenerated, and the present key pair revoked, after predetermined amounts of time to increase security. The client services and the identity provider may be configured to recognize recently revoked key pairs for a predetermined amount of time during a transition period until the new key pair has become known to all client services. This enables cached and in-flight authentication tokens to remain valid until received. Once revoked, the particular keys may be deleted from their respective key stores.

For example, the client services and the identity provider may be configured to recognize a recently revoked authentication token signing key pair until all client services have confirmed receipt of the new public key of the authentication token signing key pair to the identity provider.

Similarly, each client service and the identity provider may be configured to recognize a recently revoked client service encryption key pair until the identity provider has confirmed receipt of the new public key of the particular client service encryption key pair to the particular client service.

Any of the keys and key pairs may also be regenerated on demand, for example when a breach of security has been detected.

By way of background, asymmetric encryption algorithms have a low limit on the size of the encrypted data. In practice, an example process called "Asymmetric encryption" is composed of: generating an ephemeral symmetric key; encrypting the data with the symmetric key; encrypting the symmetric key with an asymmetric crypto method (e.g. RSA, ECC, etc. . . . ); and concatenate the encrypted symmetric key with the encrypted data. Even though it uses a combination of symmetric and asymmetric algorithms, this process is considered asymmetric because only the process that knows the asymmetric decryption key can decrypt the ephemeral symmetric key, and hence decrypt the data.

Figure 19:
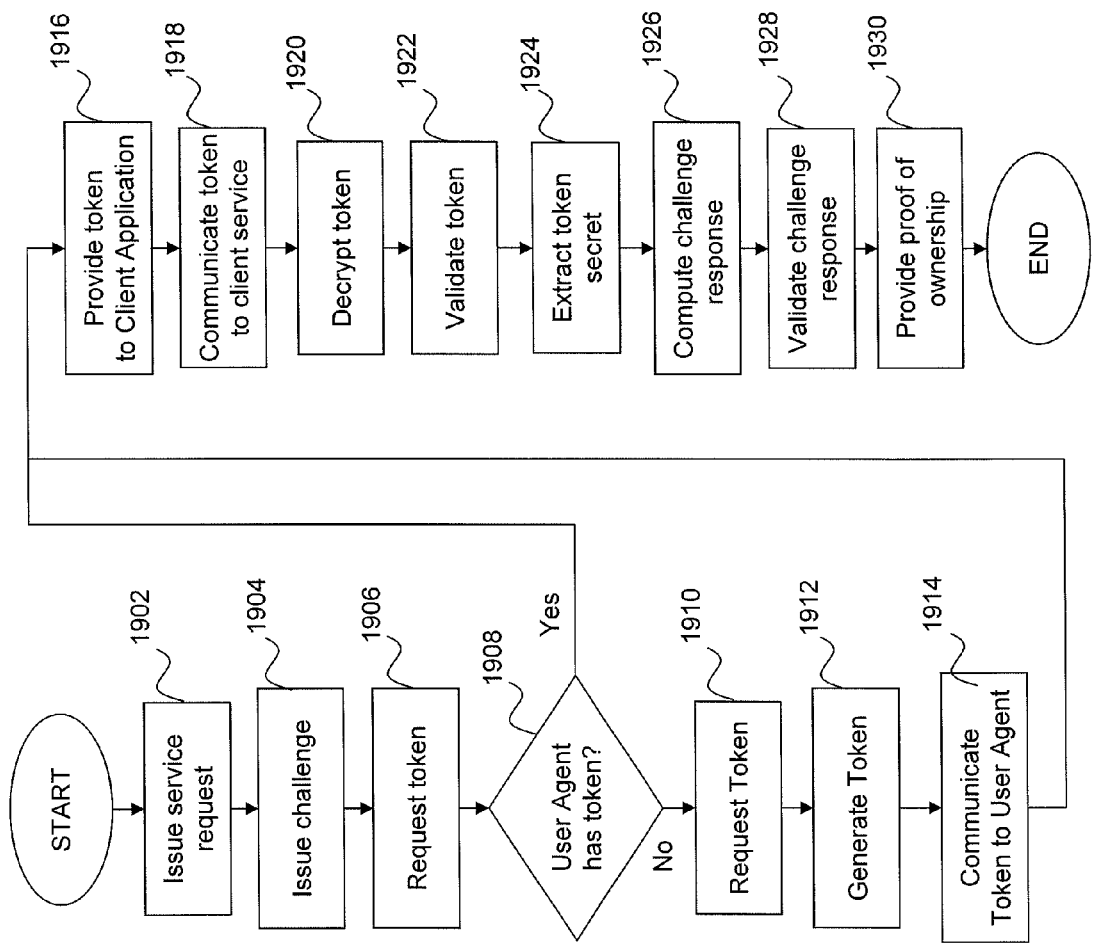
FIG. 19 is a flow diagram illustrating example computer executable instructions of another example embodiment for secure communalization of data to a client service.

Turning now to FIG. 19, the client application issues a service request 1902 to the client service. This request may be service specific. The client service may issue a challenge to the client application and indicates to the client application the particular claims required 1904, for example, that an authentication token is required. The challenge may be service specific. In a separate example embodiment, the fact that a client service requires a specific authentication token may be a pre-established policy within the client application.

The client application requests 1906 a token, corresponding to the required claims, from the user agent, including by providing a client application identifier to the user agent. The request specifies a token type that is needed by the client service and a client service identifier that identifies the client service. The client service identifier enables the identity provider to encrypt the token with the applicable public key for the particular requesting client service. The token type or the client service identifier or both may be encoded in the challenge, configured at run time or known at compile time, based on particular implementation details.

The user agent determines whether it has a valid token for the particular client service in its cache 1908. If it does not, the user agent requests a token 1910 from the identity provider.

The identity provider generates a token 1912 comprising user profile data that includes the particular claims required by the client service, a token secret, and metadata, and encrypts the token with public key 1432 of the particular client service's client service encryption key pair. The identity provider further signs the token by encrypting a digest of the token, or the token itself, with the private key 1430 of the identity provider's signing key pair.

The identity provider communicates 1914 the token and token secret to the user agent.

If the user agent does have the valid token in its cache, it provides it to the client application 1916. Regardless of whether the user agent required the token from the identity provider or had the token in its cache, the user agent then provides the token and token secret 1916 to the client application that has a client application identifier matching the client application identifier provided with the request. The client application sends the proof of ownership which may be computed based on the client service's challenge and communicates the service request, token and proof of ownership to the client service 1918.

The client service decrypts the token 1920 with the private key 1433 of its client service encryption key pair, validates the token 1922 by decrypting the signed token with the identity provider's public key 1431 (of the identity provider's encryption key pair) and extracts the token secret 1924, and user profile data. The client service then optionally computes the challenge response 1926 based on token secret and challenge, and optionally verifies that the proof of ownership 1928 sent by the client application matches the expected value. The client application also provides the client service with proof of ownership of the token secret 1930, which can for example be by http digest or another service specific mechanism to proving knowledge of a shared secret.

If the client service is able to decrypt the token and validate the token secret, the client service knows that the token was issued by the identity provider for the particular client service and was provided by the client application that knows the token secret. The client application that sent the token is also known to be the client application that requested the token on the basis of the user agent only providing the token and token secret to the client application that made the request. It is also known that the user profile data, that is the claims, were valid at the time the identity provider generated the token, and that the token refers to the user that was authenticated on the user device at the time the token was generated.

In general, an example system and method are provided for secure communication of data to a client service in communication with a client application. The method includes: generating an encrypted token, the token comprising user profile data and a token secret, the token being decryptable by the client service; communicating the token to the client service for decryption; and communicating the token secret to the client application; wherein the client service is operable to verify that the token secret communicated to the client application is equal to the token secret of the token.

In another aspect, the identity provider generates the token secret, the identity provider in communication with a mobile device, and the mobile device comprising the client application. In another aspect, if the token secret communicated to the client application is equal to the token secret of the token, the client service has a high confidence that the token comprises the user profile data.

The steps or operations in the flow charts described herein are just for example. There may be many variations to these steps or operations without departing from the spirit of the invention or inventions. For instance, the steps may be performed in a differing order, or steps may be added, deleted, or modified.

Although the above principles have been described with reference to certain specific embodiments, various modifications thereof will be apparent to those skilled in the art without departing from the scope of the claims appended hereto.

The invention claimed is:

1. A system for managing user identity information on a mobile device, the system comprising:
   the mobile device comprising a user agent and a client application, the user agent and the client application in communication with each other;
   an identity provider in communication with the mobile device, the user identity information stored on the identity provider; and
   a client service in communication with the mobile device; wherein the user agent is configured to:
   send user credentials to the identity provider for verification;
   if the user credentials are verified, receive a token from the identity provider;
   receive a request for the user identity information from the client service;
   send the request and the token to the identity provider;
   receive the user identity information from the identity provider; and
   transmit the user identity information to the client service, via the client application.

2. The system of claim 1 wherein, if the user credentials are verified, the user agent is further configured to create a credential store on the mobile device to store the user credentials and the token, the credential store in communication with the user agent; and wherein the credential store is further configured to store credentials for the client application; and wherein, to sign into the client application, the user agent is further configured to retrieve from the credential store the credentials for the client application and send the credentials for the client application to the client application; and the client application is further configured to use the credentials for the client application to log into the client application.

3. The system of claim 1 wherein the identity provider is configured to authenticate the token, and if authenticated, the identity provider is further configured to send the user identity information to the identity provider.

4. A method performed by a mobile device for managing user identity information, the method comprising:
   a user agent on the mobile device sending user credentials to an identity provider for verification, the mobile device in communication with the identity provider;
   if the user credentials are verified, the user agent receiving a token from the identity provider;
   receiving a request for the user identity information from a client service;
   sending the request and the token to the identity provider;
   retrieving the user identity information from the identity provider; and
   the user agent sending the user identity information to the client service, via a client application on the mobile device.

5. The method of claim 4 wherein the identity provider comprises a server, and the client service comprises another server.

6. The method of claim 4 wherein the mobile device comprises an operating system, and the method further comprises the operating system invoking the user agent when turning on the mobile device.

7. The method of claim 4 wherein the mobile device comprises multiple client applications, and the method further comprises the mobile device, upon signing into the user agent, signing into the multiple client applications.

8. The method of claim 4 further comprising, if the user credentials are verified, creating a credential store on the mobile device to store the user credentials and the token.

9. The method of claim 4 wherein the user credentials comprise a username and a password.

10. The method of claim 4 further comprising:
    displaying a graphical user interface on the mobile device, and receiving through the GUI the user credentials.

11. The method of claim 8 wherein the credential store stores credentials for the client application.

12. The method of claim 11 wherein, to sign into the client application, the method further comprises the user agent retrieving from the credential store the credentials for the client application and sending the credentials for the client application to the client application; and the client application using the credentials for the client application to log into the client application.

13. A mobile device configured to manage user identity information, the mobile device comprising a processor, memory, a communication device, a user agent and a client application in communication with the user agent, wherein the mobile device is in communication with a client service and an identity provider; and the mobile device is configured to at least:
send user credentials to the identity provider for verification using the user agent;
if the user credentials are verified, receive a token from the identity provider using the user agent;
receive a request for the user identity information from the client service;
send the request and the token to the identity provider;
retrieve the user identity information from the identity provider; and
send the user identity information to the client service, via a client application on the mobile device.

14. The mobile device of claim 13 wherein the mobile device comprises an operating system that is configured to at least invoke the user agent when turning on the mobile device.

15. The mobile device of claim 13 further comprising multiple client applications, and the mobile device is further configured to at least, upon signing into the user agent, sign into the multiple client applications.

16. The mobile device of claim 13 wherein the mobile device is configured to at least create a credential store on the mobile device to store the user credentials and the token, if the user credentials are verified.

17. The mobile device of claim 13 wherein the user credentials comprise a username and a password.

18. The mobile device of claim 13 wherein the mobile device is further configured to at least display a graphical user interface on the mobile device, and receive through the GUI the user credentials.

19. The mobile device of claim 16 wherein the credential store is configured to store credentials for the client application.

20. The mobile device of claim 19 wherein, to sign into the client application, the mobile device is further configured to at least: retrieve from the credential store the credentials for the client application using the user agent and send the credentials for the client application to the client application; and use the credentials for the client application to log into the client application.

* * * * *